US012098556B2

(12) United States Patent
Peñaloza

(10) Patent No.: US 12,098,556 B2
(45) Date of Patent: Sep. 24, 2024

(54) SHOWER TRAY AND WALL PANELS

(71) Applicant: Bruno J Peñaloza, Del Mar, CA (US)

(72) Inventor: Bruno J Peñaloza, Del Mar, CA (US)

( * ) Notice: Subject to any disclaimer, the term of this patent is extended or adjusted under 35 U.S.C. 154(b) by 262 days.

(21) Appl. No.: 17/717,901

(22) Filed: Apr. 11, 2022

(65) Prior Publication Data

US 2022/0325530 A1 Oct. 13, 2022

Related U.S. Application Data

(60) Provisional application No. 63/173,310, filed on Apr. 9, 2021.

(51) Int. Cl.
| | | |
|---|---|---|
| *E04F 13/08* | (2006.01) | |
| *A47K 3/40* | (2006.01) | |
| *B32B 5/24* | (2006.01) | |
| *B32B 7/12* | (2006.01) | |
| *B32B 9/00* | (2006.01) | |
| *B32B 9/04* | (2006.01) | |
| *B32B 17/06* | (2006.01) | |

(52) U.S. Cl.
CPC ............ *E04F 13/0871* (2013.01); *A47K 3/40* (2013.01); *B32B 5/245* (2013.01); *B32B 7/12* (2013.01); *B32B 9/002* (2013.01); *B32B 9/005* (2013.01); *B32B 9/047* (2013.01); *B32B 17/067* (2013.01); *E04F 13/0866* (2013.01); *E04F 13/0875* (2013.01); *B32B 2260/023* (2013.01); *B32B 2260/046* (2013.01); *B32B 2262/101* (2013.01); *B32B 2307/304* (2013.01); *B32B 2419/00* (2013.01)

(58) Field of Classification Search
CPC .............. E04F 13/0871; E04F 13/0866; E04F 13/0875; A47K 3/40; B32B 5/245; B32B 7/12; B32B 9/002; B32B 9/005; B32B 9/047; B32B 17/067; B32B 2607/00; B32B 2260/023; B32B 2260/046; B32B 2262/101; B32B 2307/304; B32B 2419/00

USPC .................................... 4/613, 614; 52/34, 35
See application file for complete search history.

(56) References Cited

U.S. PATENT DOCUMENTS

| | | | | |
|---|---|---|---|---|
| 3,646,180 A | * | 2/1972 | Winnick | B32B 7/12 52/309.3 |
| 2003/0188379 A1 | * | 10/2003 | Cowell | A47K 3/30 4/614 |
| 2008/0022452 A1 | * | 1/2008 | Lock | E04B 1/6141 4/614 |
| 2013/0097944 A1 | * | 4/2013 | Van Ravenhorst | E04F 13/0803 52/35 |
| 2015/0107018 A1 | * | 4/2015 | Vagedes | A47K 3/02 4/613 |

* cited by examiner

*Primary Examiner* — Tuan N Nguyen
(74) *Attorney, Agent, or Firm* — Barry Choobin; Patent 360

(57) ABSTRACT

A prefabricated assembly for covering walls and floor in a building, and in particular, for bathrooms, and other units in a building that requires waterproofing and an aesthetic finish. The prefabricated assembly can include finished panels for use in shower surrounds and shower tray. The prefabricated wall panels can have tiles and natural stones as the finishing layer that provides an aesthetic appearance. The prefabricated panels are manufactured in an industrial setting and transported on-site. The prefabricated panels include interlocking fasteners that make assembly quick and easy.

14 Claims, 32 Drawing Sheets

SHOWER TRAY AND WALL PANELS

CROSS-REFERENCE TO RELATED APPLICATIONS

This application claims priority to the U.S. provisional patent application Ser. No. 63/173,310, filed on, Apr. 9, 2021, which is incorporated herein by reference in its entirety.

FIELD OF INVENTION

The present invention relates to a prefabricated shower surround, and more particularly, the present invention relates to a shower pans, shower surrounds, bathtub surrounds, kitchen backsplashes, wainscots, floors, etc.

BACKGROUND

Shower surrounds are popular among house owners for their aesthetic looks and protection of walls from the moisture. The wall surround is waterproof and is made from a smooth material, such as ceramic tiles and acrylics. The smooth surface makes the cleaning easy and prevents the growth of mildew. A range of materials are available for wall surrounds that vary in cost and time for installation.

Shower base, also known as a shower tray or shower pan are an essential part of the shower surrounds that makes the tray and has a provision to drain the water. Shower trays are generally manufactured from acrylics and polyurethane. Attempts to made tiled shower trays have failed due to variety of reasons and limitations. The primary reason being the manufacturers failed to create a tray interior that has the structural integrity and functionality necessary to withstand being tiled in a factory, transported to a new location, handled, maneuvered, and installed with ease, and have lasting durability. Known "tile-ready" or "tileable" type products are not designed to be tiled until after they have been installed because they are not stable and strong enough to be moved off a fully supportive surface once the tile has been applied. If an attempt were made to manufacture a tray out of stronger conventional materials (such as cement) it would be too heavy to transport and handle. Conventional materials and methods would have added challenges of waterproofing, drain connectivity, crack resistance, and durability.

Besides shower tray, many other surfaces in a residential and commercial living spaces, such as shower surrounds, bathtub surrounds, kitchen backsplashes, wainscots, floors, etc. must be waterproof and have an aesthetically pleasing finish. Currently, these surfaces are constructed by first installing a rough water-resistant underlying layer, and subsequently adding a layer of finish pieces (tile, natural stone, designer glass, etc.). The water-resistant layer consists of either sheeting (backer board, etc.) or hand-laid concrete cement, either of which can be given enhanced waterproofing by adding a paper membrane prior to application and/or adding an appropriate coating after application. The waterproof finish pieces are hand-laid over the underlying layer. Adhesive is applied to bond the finish pieces to the underlying layer, with each finish piece being individually attached. The interstitial gaps between the finish pieces must be of a consistent pattern and dimension to provide an aesthetically pleasing finish. This is accomplished by hand-inserting small spacers between each adjacent finish piece, and subsequently removing the spacers after the finish pieces have adhered to the underlying layer. Grout is then applied to the interstitial gaps between the finish pieces.

The manual process is extremely labor and time intensive, and requires that large, heavy materials be carried to the installation site. Massive amounts of debris and dust are created during this process, which necessitates clearance from the site both during and after installation. The installer must work against gravity when tiling and grouting the walls, involving great physical effort, and further prolonging the process. In addition, the materials (cement etc.) add unnecessary weight to the building structure and they are prone to water damage. Besides so much effort, the quality or output may not be consistent due to human factor which varies greatly.

Prefabricated building structures or units are also becoming popular which can be assembled onsite with minimum labour and in short time. These prefabricated units are usually comprised of one or more plastic moldings, (also fiberglass, composites, etc.), the surface of which can be treated to resemble tile or stone. These units are unattractive, do not add value to the building and are usually employed only in those applications where cost is of paramount importance. More recently, additional improvements have been made to the underlying layers, with new bathroom and wall backing systems entering the market that replace the underlying layer with new materials and methods (polystyrene etc.). While some of these systems can offer a faster, more efficient installation and improved performance, they still require all finish pieces to be hand-laid at the installation site. Regarding applying the finish pieces, these systems have the same time, labor, quality, consistency, and cost implications.

There currently exists an industry need for a prefabricated structural units for shower surrounds and the like that takes less time to install and natural materials like stone and porcelain can be used.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a prefabricated shower surround assembly that can be installed onsite with lesser labour and quickly.

It is another object of the present invention that the shower surround assembly provides an aesthetic and luxurious finish.

It is a still another object of the present invention that the shower surround assembly is durable having compressive strength and hardness.

It is yet another object of the present invention that the shower surround assembly is light in weight.

It is an additional object of the present invention that the shower surround assembly is non-absorbent & waterproof.

It is still an additional object of the present invention that the shower surround assembly has dimensional stability.

It is a yet an additional object of the present invention that the deposition and growth of mildews and is easy to clean.

In one aspect, disclosed is a building assembly that can be installed along an existing walls of a bathroom. The disclosed building assembly includes prefabricated structural units that can be assembled and installed on site with minimum labor and quickly. The prefabricated structural units can include shower pans, shower surrounds, bathtub surrounds, kitchen backsplashes, wainscots, etc. The disclosed structural units include waterproof, lightweight, and mold-resistant backing layer and a finished outer layer. The outer layer can be manufactured from aesthetic materials, such as natural stone, porcelain, ceramic tile, glass, etc.

In certain implementations, the disclosed prefabricated structural units of the building assembly can be manufactured in an industrial settings and the manufactured prefabricated structural units can be transported on-site. The building assembly can include all the prefabricated structural units for a given household unit, for example, nine interlocking vertical panels can cover walls of a bathroom. Each wall of the shower surround can have three panels stacked vertically. Also, the building assembly for the bathroom can include a shower tray that can mates with the bottom wall panels. The tray can be manufactured as a single unit that can cover entire floor area of the bathroom. It is an object of the present invention that the prefabricated structure units remain securely held in their correct location and precise alignment; have watertight joints; have watertight connections to the framing studs; have an aesthetically consistent finish, whereby the gap between the finish pieces of two adjacent panels (or panels and pan) is the same width as, and lines up with, that of the interstitial gaps between the finish pieces throughout the panels. This is achieved by interlocking and/or overlapping backing material and finish pieces; inter-panel (and panel-pan) connection structures that lock panels into their correct location and alignment; system-stud connection points which allow the panels to be attached to the framing studs invisibly and securely, but do not compromise the structural integrity of the panels.

BRIEF DESCRIPTION OF THE DRAWINGS

The accompanying Figures, which are incorporated herein, form part of the specification and illustrate embodiments of the present invention. Together with the description, the Figures further explain the principles of the present invention and to enable a person skilled in the relevant arts to make and use the invention.

DETAILED DESCRIPTION

Figure 1A:
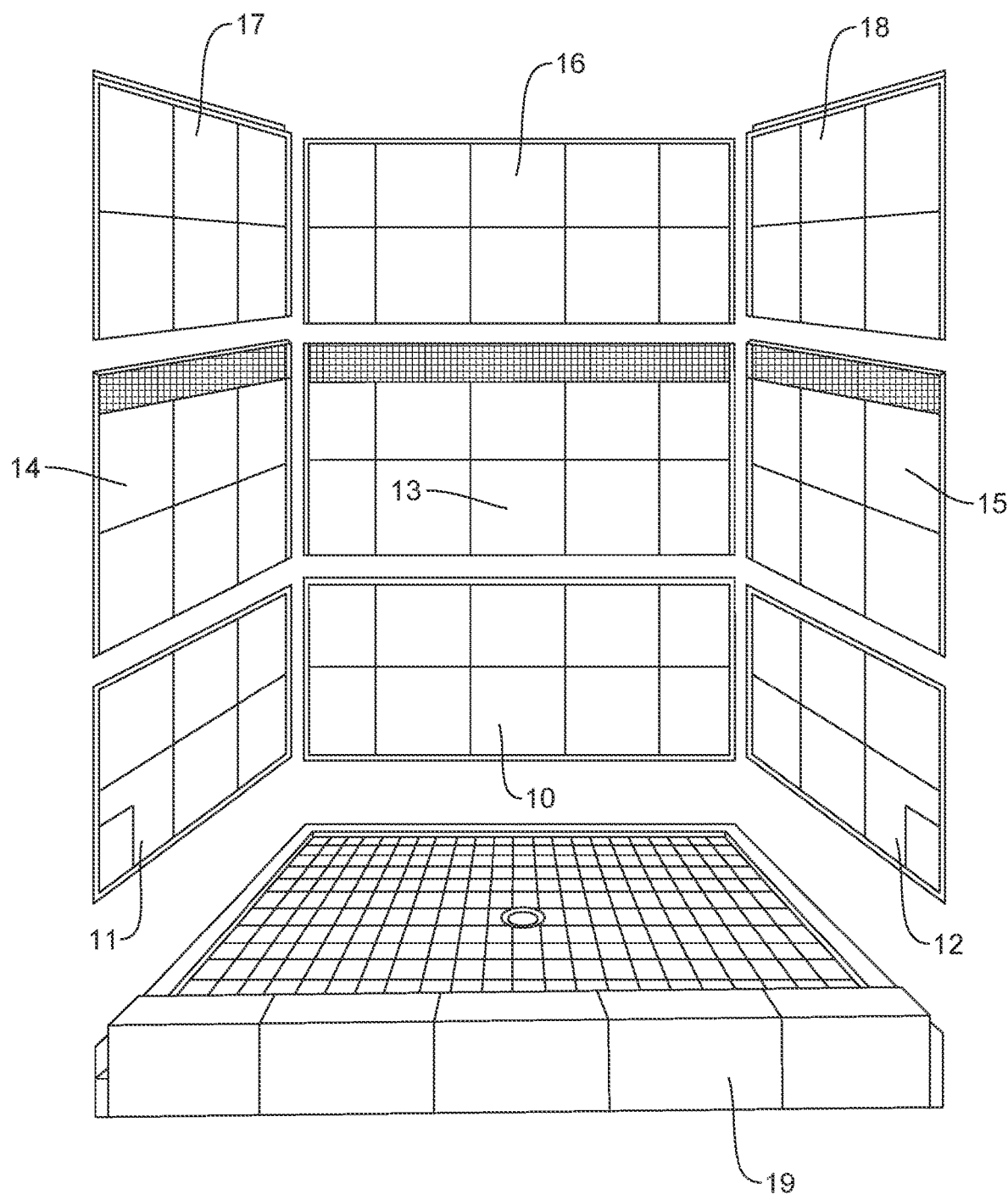
FIG. 1a shows an exploded front perspective view of a shower surround and a shower tray, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

REFERENCE NUMERALS

10 Back Bottom Panel
11 Left Bottom Panel
12 Right Bottom Panel
13 Back Middle Panel
14 Left Middle Panel
15 Right Middle Panel
16 Back Top Panel
17 Left Top Panel
18 Right Top Panel
19 Shower Pan
20 Grout
21a, 21b Panel Finish Pieces/Pan Finish Pieces
22a, 22b Panel Upper and Lower Composite Layers
22c, 22d, 22e Pan Upper, Lower and Side Composite Layers
23a, 23b, 23c Panel Core/Pan Core/Pan Curb Core
24 Panel Edge Framing
25a Cylindrical Hole
25b Drain
25c Drain Fitting Bonding Agent
26 Shower Pan Flange-to-Finish Piece Gap
27a, 27b, 27c Shower Pan Centre Flange/Left Flange/Right Flange
29a, 29b, 29c, 29d, 29e, 29f Corner Lips (left and right on panel 10/13/16)

30 Tabs (on panel 16/17/18)
31 Oval Holes
32 Keyhole Holes
33 Locating Screw
34 Flush Edge
35(b) Narrow Bottom Mating Edge/(variation for panels 11 and 12 when with curb)
36 Wide Side Mating Edge
37 Narrow Side Mating Edge
38 Top Mating Edge
39 Bottom Mating Edge
40 Gapped Finish Edge
41 Top Finish Edge
42 Finished Curb Disclosed is a prefabricated building assembly that can be used to cover the wall and floor in a building, such as bathrooms, kitchens, and the like. The prefabricated building assembly can include multiple interlocking structural units or members. The multiple interlocking structural units can include prefabricated wall panels to cover the wall of a room and prefabricated wall panels that can cover floor of a room. For example, disclosed is a prefabricated shower surround consisting of interlocking wall panels that can cover wall of a bathroom and a prefabricated shower tray that can cover the floor of the bathroom.

Figure 1B:
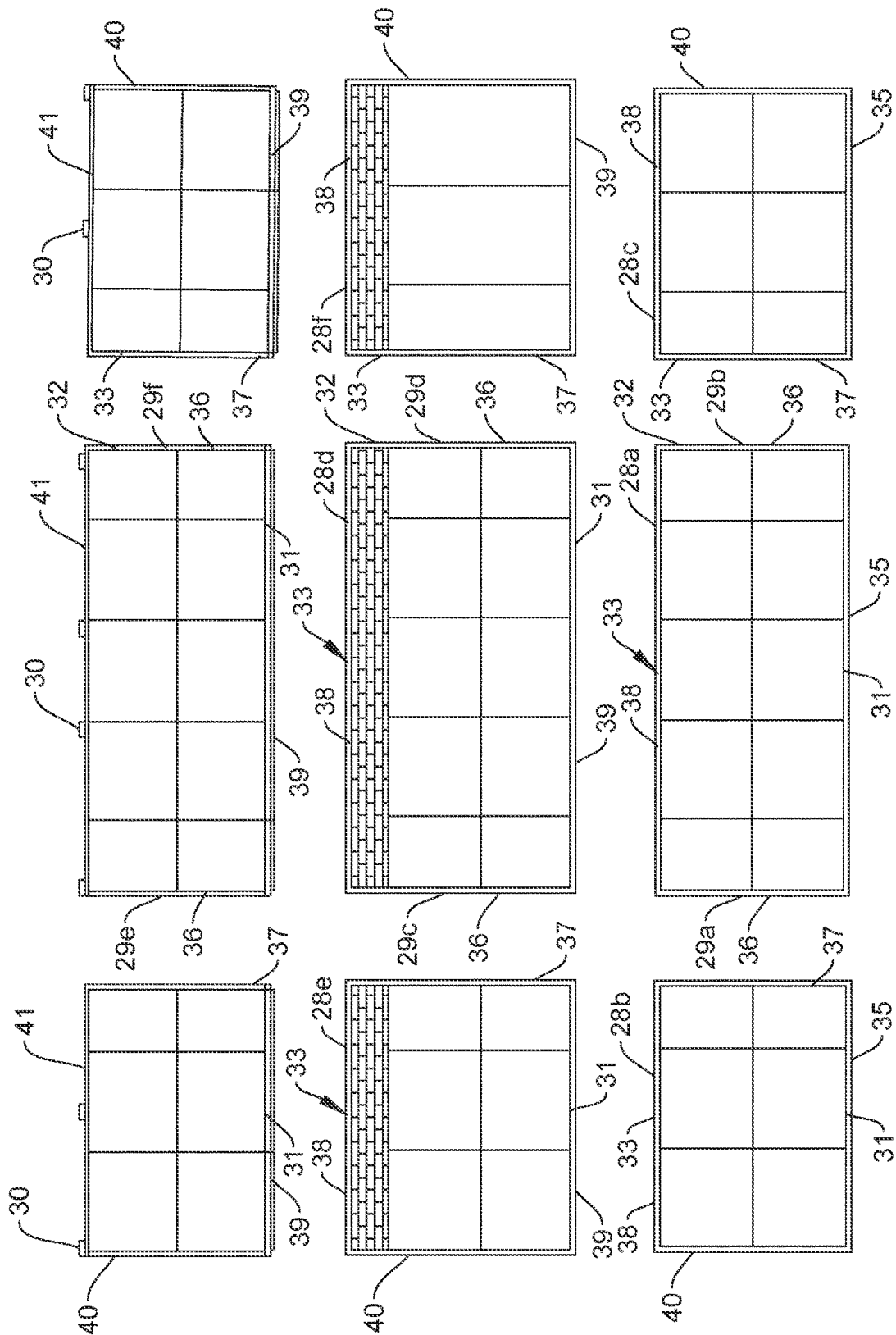
FIG. 1b is an exploded front view of the shower surround shown in FIG. 1a, according to an exemplary embodiment of the present invention.
Figure 1C:
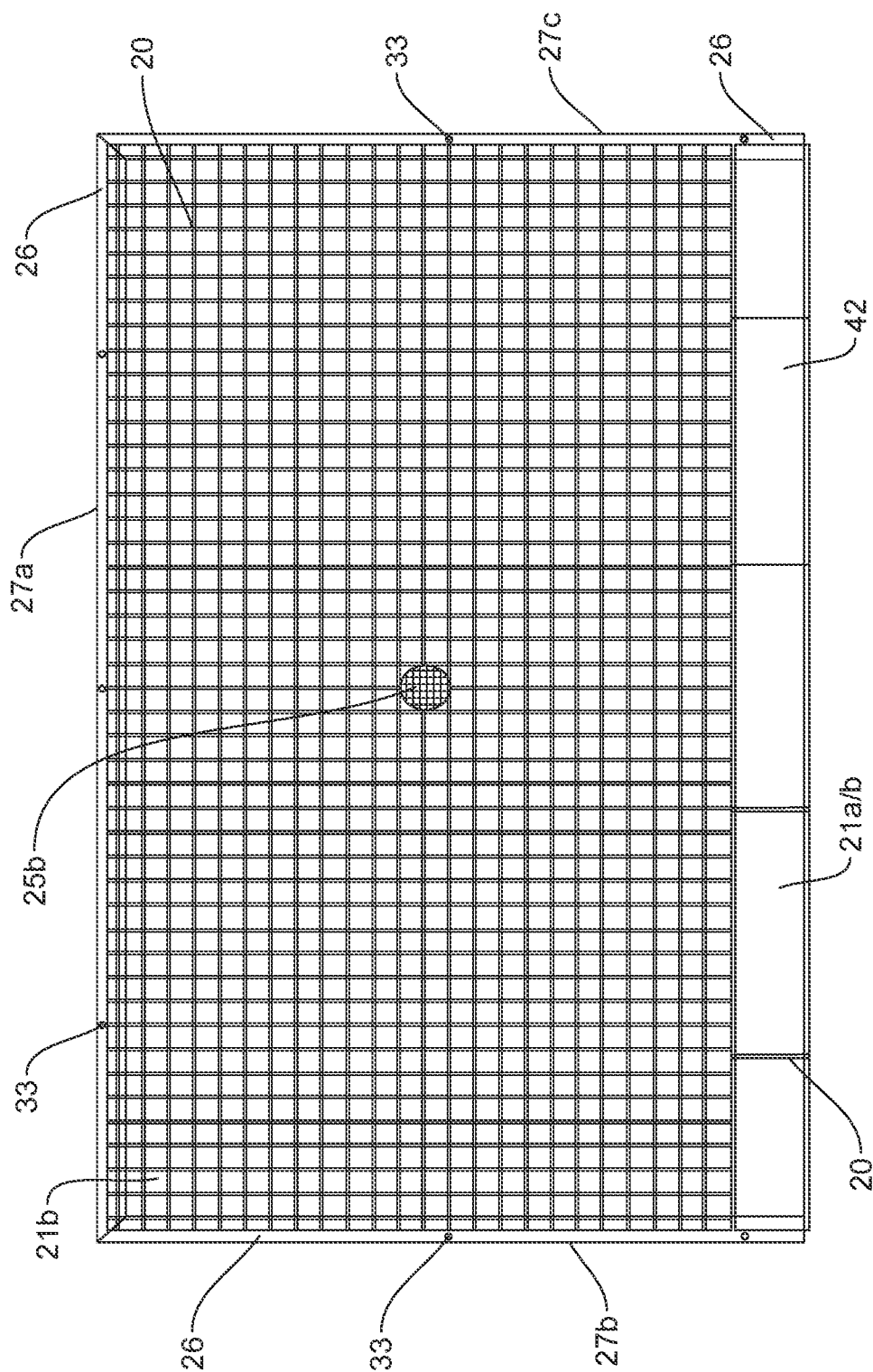
FIG. 1c is a top view of the shower pan, according to an exemplary embodiment of the present invention.

In certain implementations, disclosed is a complete shower installation as the building assembly that can include at least nine interlocking panels, numerals 10 to 18 in FIG. 1a, which form the surround wall of the bathroom. The disclosed shower installation can also include a shower pan 19 to cover the floor of the bathroom that is shown as a single unit. Four main edge configurations exist within the system walls, with each one featuring a particular arrangement of specialized structures. The four configurations are: the edges along the bottom of the walls (narrow bottom mating edge 35) which are designed to mate with the shower pan; the edges around the sides and top of the system (either a gapped finish edge 40 or flush edge 34 at the sides and top finish edge 41 at the top) which are designed to meet the surrounding drywall or other conventional walling material; the inter-panel horizontal coplanar edges (top and bottom mating edges 38 and 39) which are designed to allow two panels to meet one above the other; and the inter-panel orthogonal edges (wide side and narrow side edges 36 and 37) which are designed to allow two panels to meet at the vertical corners of the walls, (FIG. 1b). The edges of every panel, irrespective of their edge configuration and placement within the overall system, are designed to allow the panel to be secured directly into the framing studs at the installation site, without the need for additional backing material. The shower pan 19 has its own particular edge configuration, designed to mate with the bottom of the walls (FIG. 1c).

The shower system is installed in a specific order, starting from the bottom, and working up to the top, with the shower pan 19 being the first item to be fitted. Following this, the order of installation for the panels is as follows: back bottom panel 10; left and right bottom panels 11 and 12 (in either order); back middle panel 13; left and right middle panels 14 and 15 (in either order); back top panel 16; left and right top panels 17 and 18 (in either order). The following descriptions of implementation assume that the floor of the unit at the installation site is even and level and that the framing studs are plumb and level. (If this is not the case, the floor and framing studs are corrected using conventional means, e.g., mortar cement for the floor, shims for the studs, etc.)

Figure 2A:
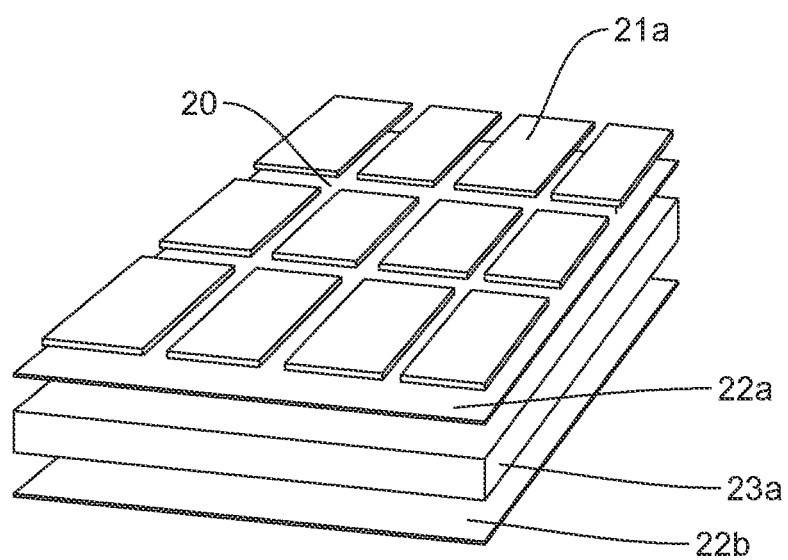
FIG. 2a shows a central structure of a prefabricated panel, according to an exemplary embodiment of the present invention.
Figure 2B:
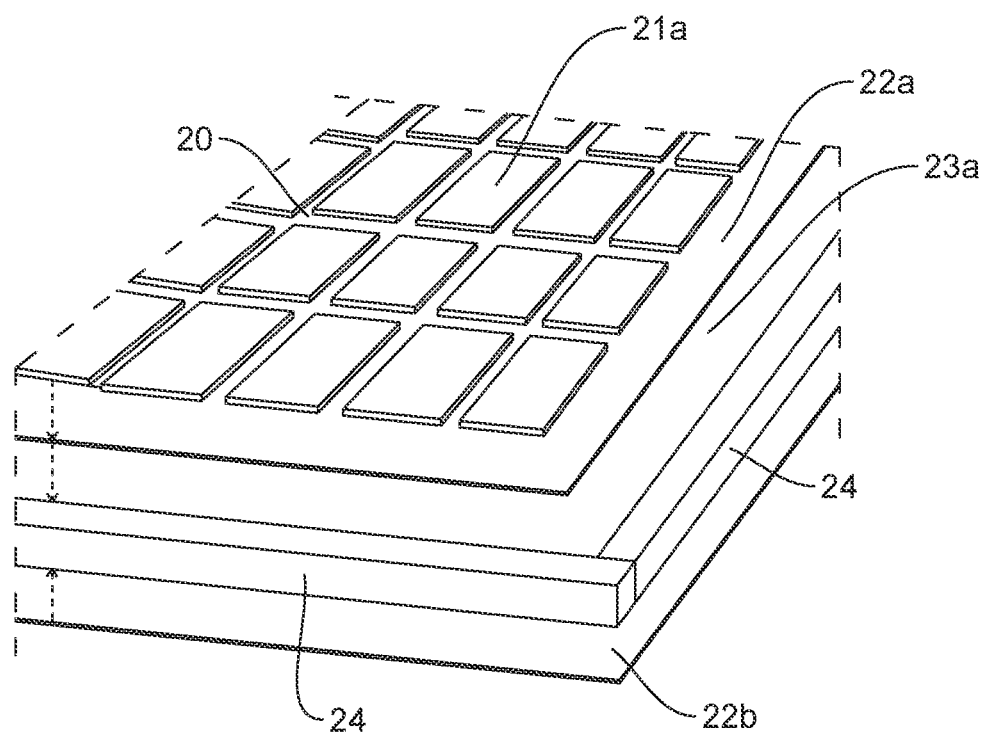
FIG. 2b. shows an edge area of a prefabricated panel, according to an exemplary embodiment of the present invention.
Figure 3A:
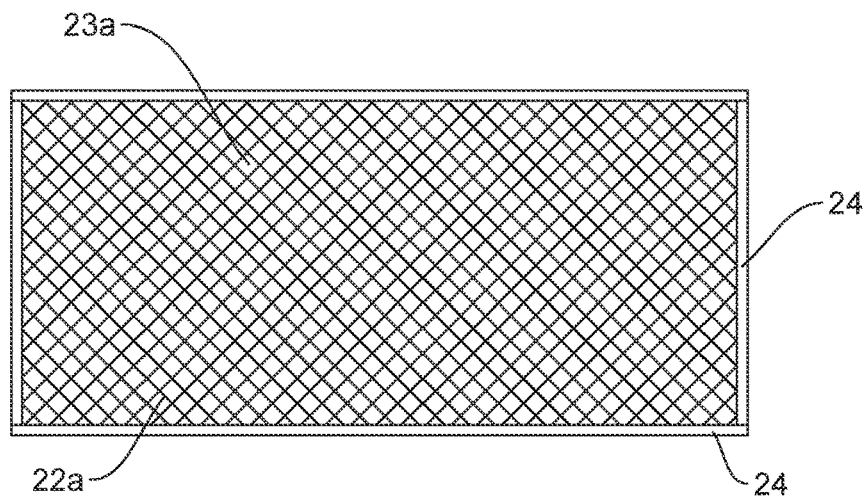
FIG. 3a is top view of a prefabricated panel showing an edge framing, according to an exemplary embodiment of the present invention.
Figure 3B:
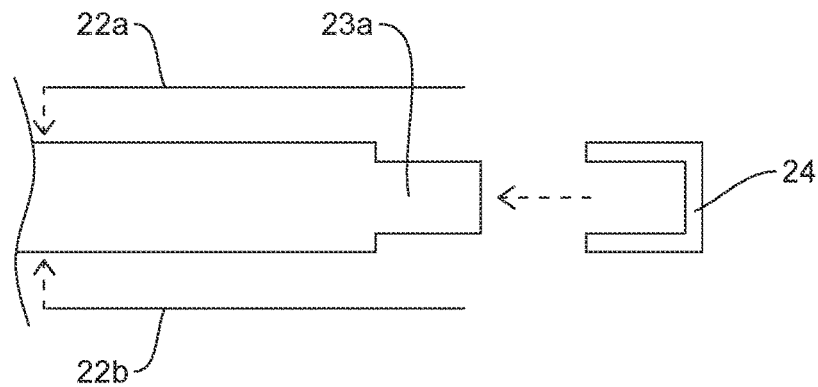
FIG. 3b is a cross-sectional view of the prefabricated panel showing the edge framing, according to an exemplary embodiment of the present invention.
Figure 3C:
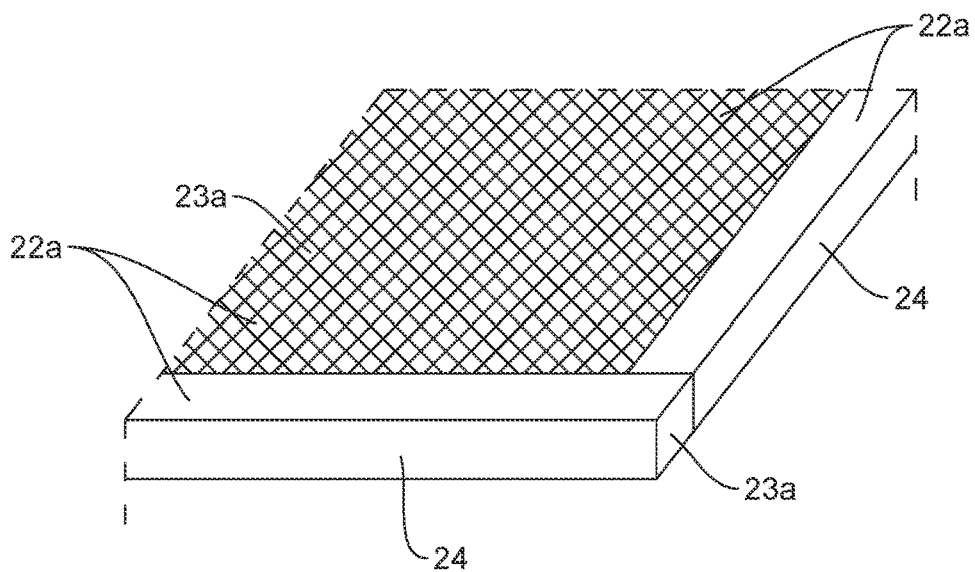
FIG. 3c is an enlarged view of a corner of the prefabricated panel further showing the edge framing, according to an exemplary embodiment of the present invention.

PANEL GENERAL COMPOSITION: Each panel consists of a backing sheet, upon which the finish pieces 21a (tile, natural stone, glass etc.) are bonded and grouted 20. The central area of the backing sheet is comprised of a panel core 23a sandwiched between an upper composite layer 22a and a lower composite layer 22b (FIG. 2a). The panel core 23a consists of a lightweight, mold-resistant, watertight material (urethane foam, polystyrene foam, composite honeycomb, etc.). Each outer edge of a backing sheet has a panel edge framing 24, which provides a strong, straight edge and allows for additional structures to be attached or cut into it (FIG. 2b). The panel core 23a is routed to accept the panel edge framing 24, which consists of a U-channel fabricated from a strong, watertight material (aluminum, polycarbonate, resin fiber composite, etc.), (FIGS. 3a and 3b). The panel edge framing 24 is adhered to the panel core 23a using a suitably strong adhesive agent (epoxy resin, polyester resin, etc.) The upper composite layer 22a and lower composite layer 22b consist of high-strength cloth (fiberglass, bamboo, basalt, etc.) impregnated with bonding agent (epoxy resin, polyester resin, etc.), that are applied on the top and bottom of the panel core 23a and covering the panel edge framing 24 (FIGS. 3b and 3c). The upper composite layer 22a, which may contain an additional antifungal ingredient, is impregnated with a bonding agent appropriate for providing both structural integrity and for securing the finish pieces 21a to the completed backing sheet. The lower composite layer 22b is impregnated with a bonding agent appropriate for providing structural integrity to the completed backing sheet. Additional structures along the edges of panels (oval holes 31, keyhole holes 32, locating screws 33, edge lips 28a-f and corner lips 29a-f) are individual panel specific, being dependent on their placement in the overall configuration, (see 00059-00067). The finish pieces 21a are laid out and adhered in the desired configuration to a panel while it is on an even, level surface in a controlled environment. The interstitial gaps between finish pieces 21a are grouted 20 after the tiles 21a have been adhered and while the panel is still lying flat. The stages of panel manufacturing may be achieved by hand or with the aid of machinery and tooling and may occur in one or multiple phases.

Figure 4:
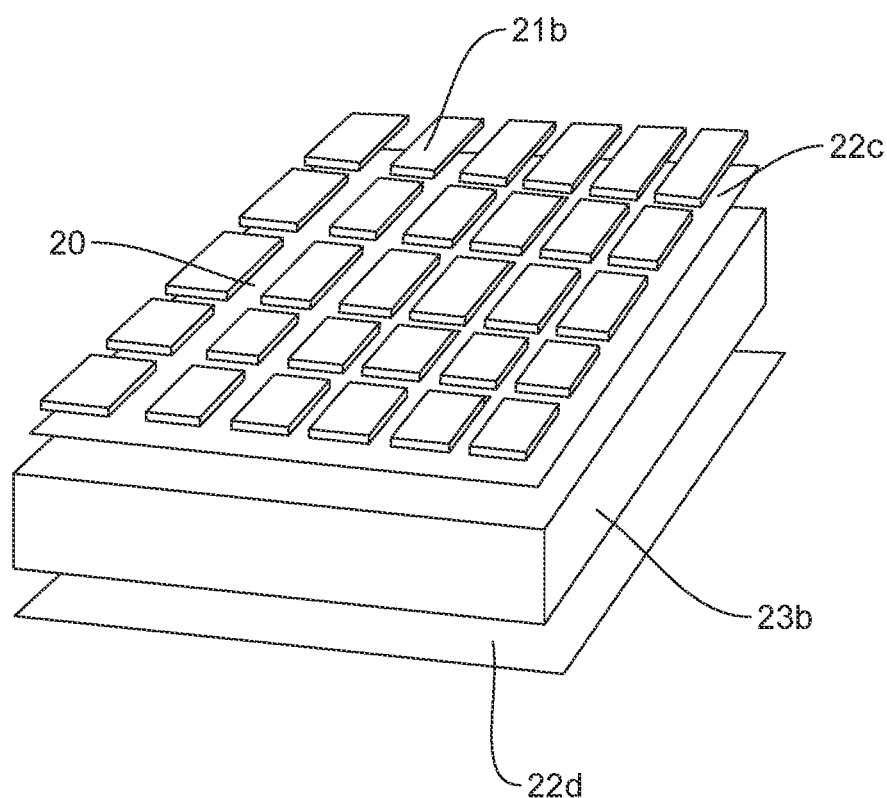
FIG. 4 is an exploded view of a shower pan, according to an exemplary embodiment of the present invention.
Figure 5A:
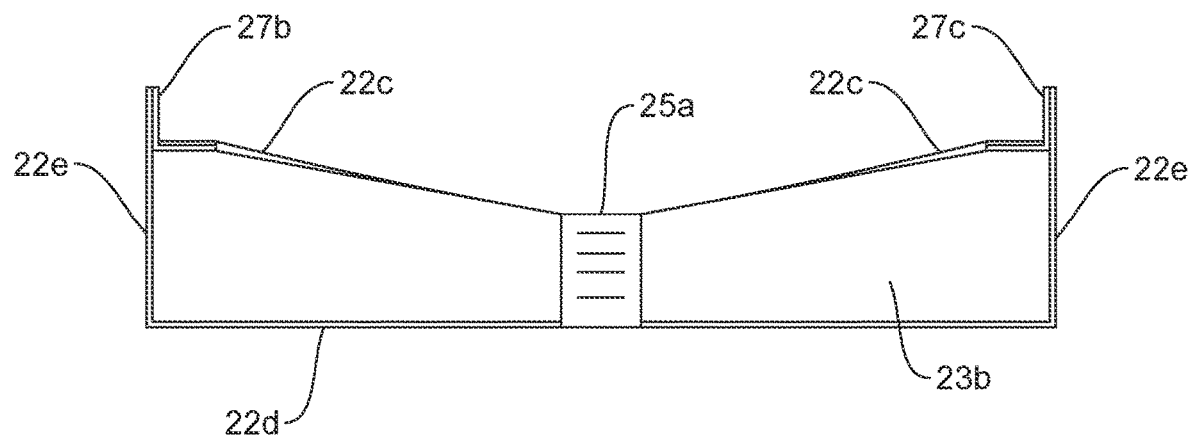
FIG. 5a is a cross sectional view of the shower pan showing the shower pan pitch and edge area with flanges, according to an exemplary embodiment of the present invention.
Figure 5B:
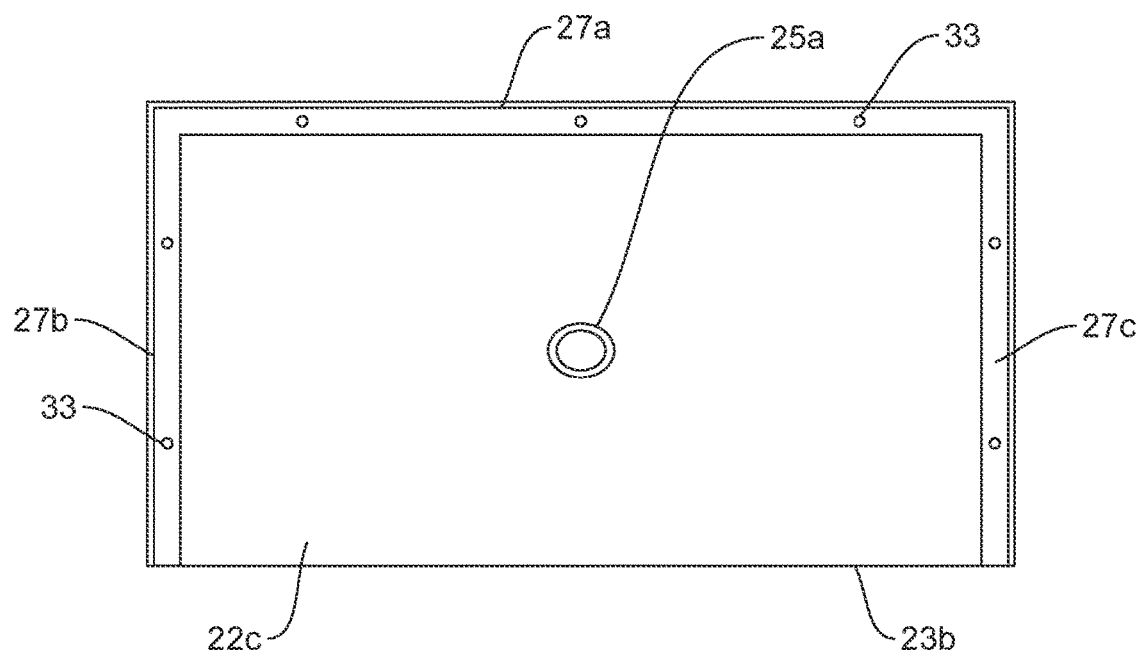
FIG. 5b is a top view of the shower pan showing the shower pan flanges, according to an exemplary embodiment of the present invention.
Figure 5C:
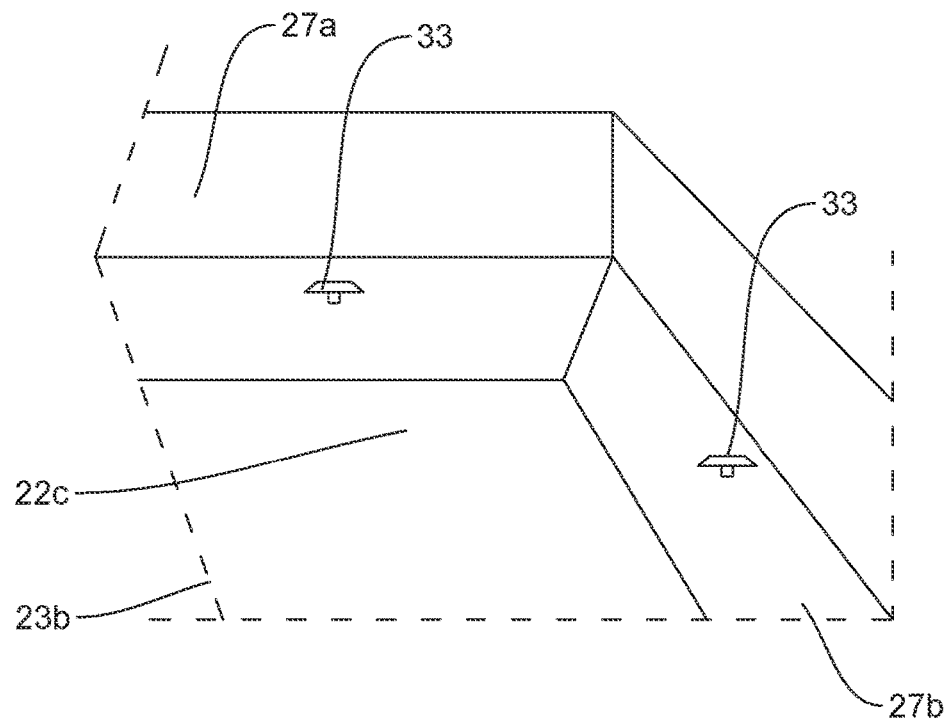
FIG. 5c is an isometric view of a back right corner of the shower pan further showing the shower pan flanges and associated features, according to an exemplary embodiment of the present invention.
Figure 6:
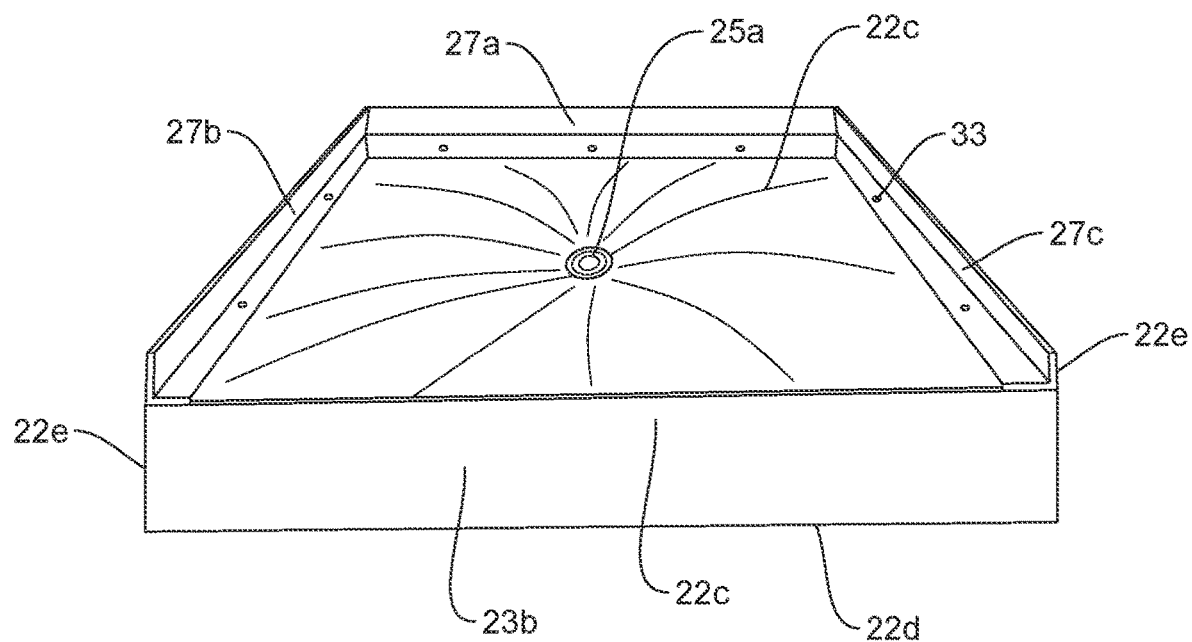
FIG. 6 is an isometric view of the shower pan without a front curb, according to an exemplary embodiment of the present invention.
Figure 7:
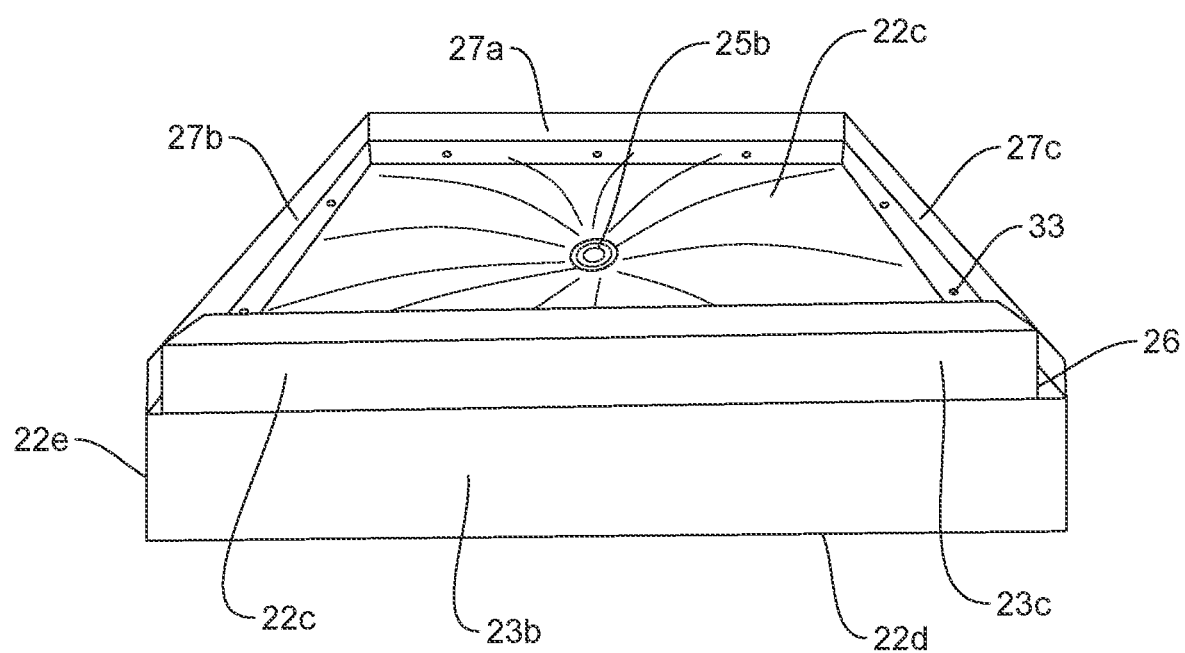
FIG. 7 is an isometric view of the shower pan with a front curb, according to an exemplary embodiment of the present invention.
Figure 8A:
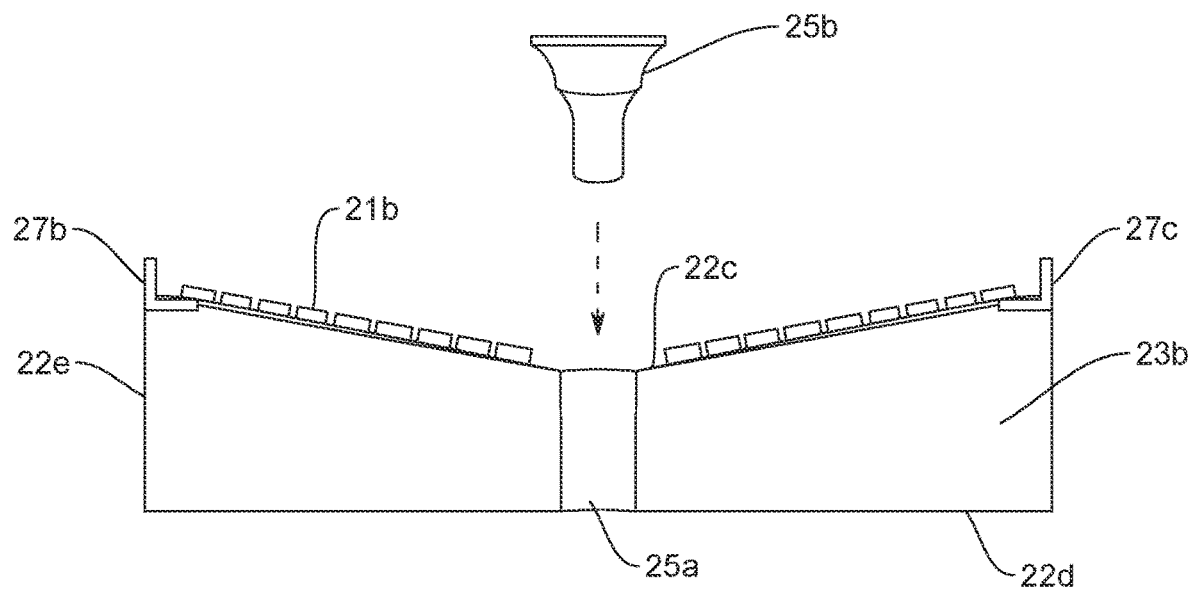
FIG. 8a is an exploded cross-sectional view of the shower pan further showing the drain fitting and associated structures, according to an exemplary embodiment of the present invention.
Figure 8B:
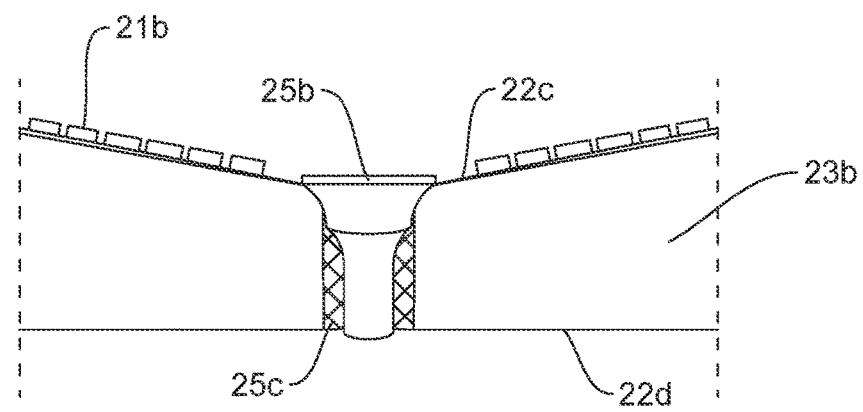
FIG. 8b is a cross-sectional view of the shower pan showing the completed drain fitting, according to an exemplary embodiment of the present invention.
Figure 9A:
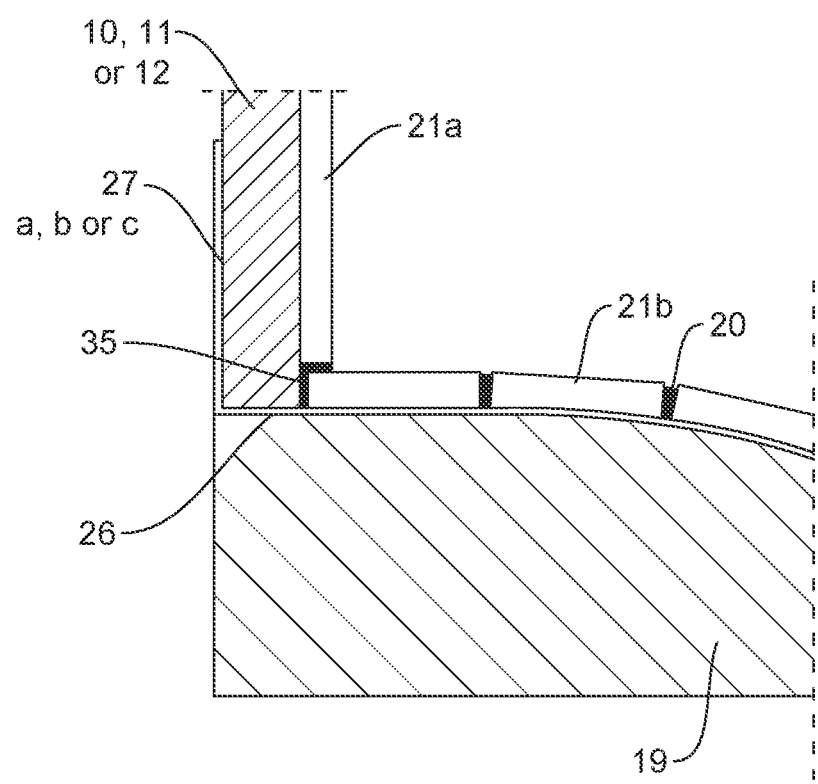
FIG. 9a is a cross-sectional view of a mated bottom wall panel and a shower pan, according to an exemplary embodiment of the present invention.
Figure 9B:
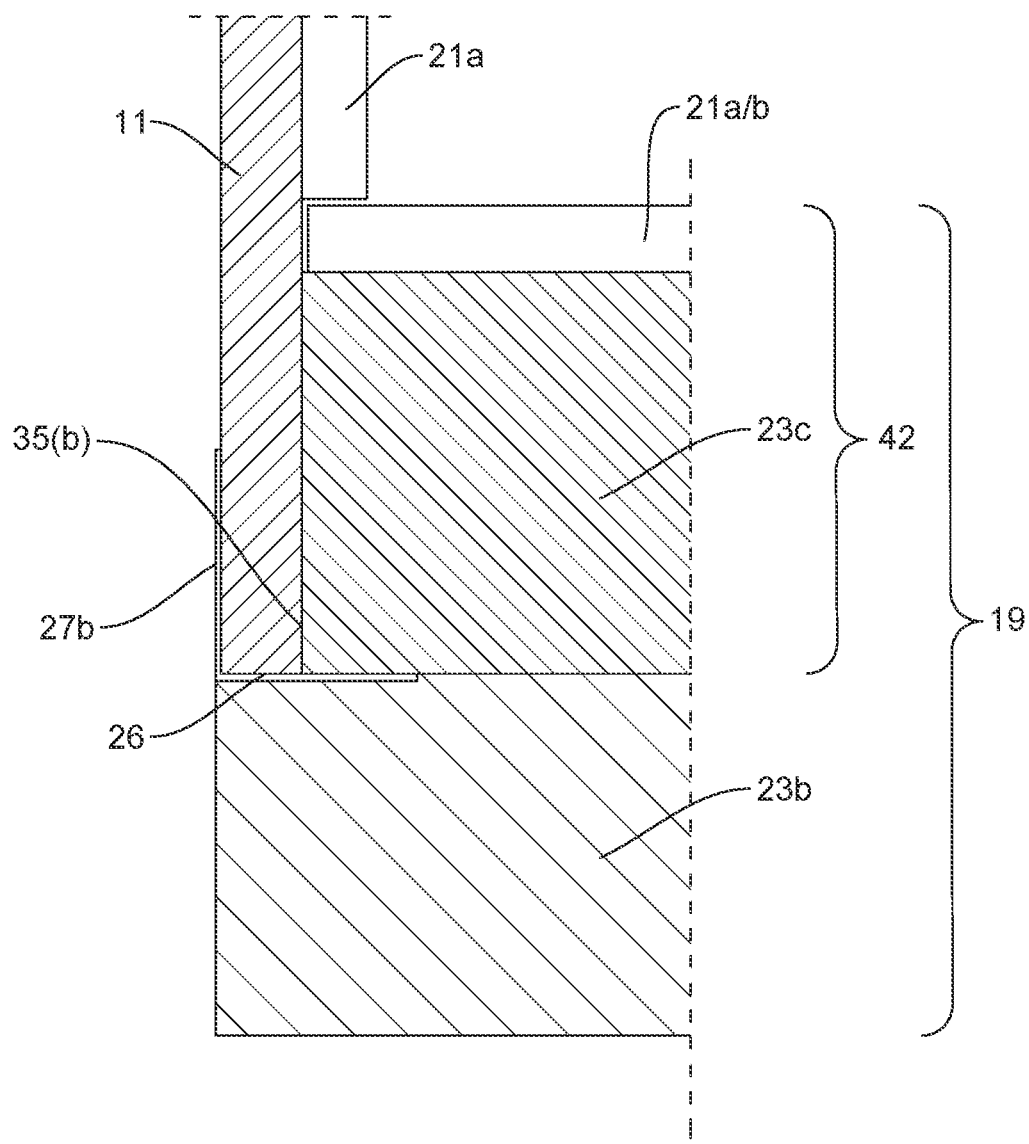
FIG. 9b is a cross-sectional view of a mated side bottom panel and shower pan showing the additional configuration for connecting the side bottom panels with a curbed shower pan, according to an exemplary embodiment of the present invention.
Figure 12:
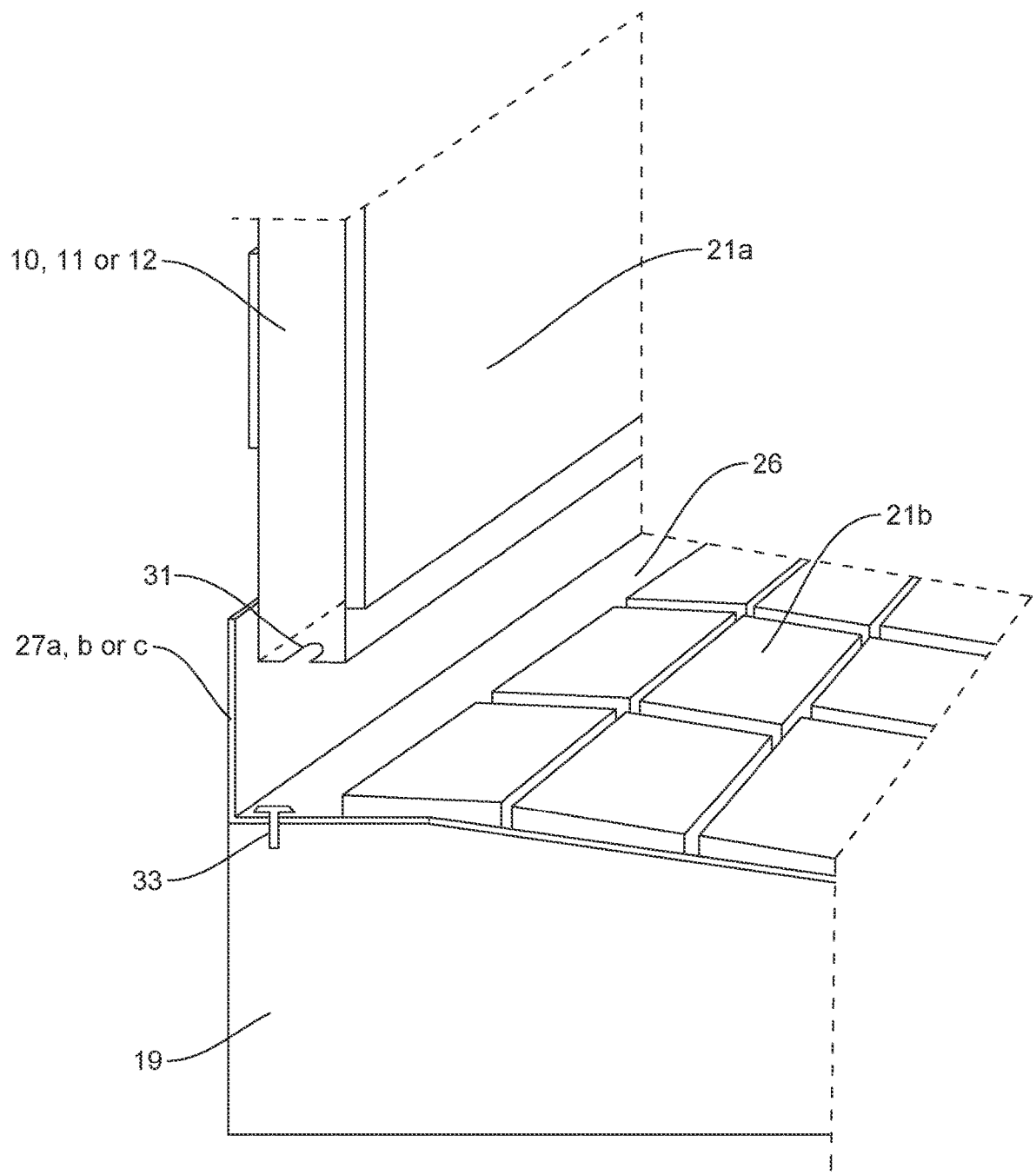
FIG. 12 is an isometric cross-sectional view of a bottom panel and a shower pan showing the coupling of oval holes and locating screws, according to an exemplary embodiment of the present invention.

PAN GENERAL AND SPECIFIC COMPOSITION. Shower pan 19a mates with back bottom panel 10, left bottom panel 11 and right bottom panel 12 (FIGS. 1a and 1c). Shower pan 19 consists of a central sheet, upon which the finish pieces 21b (porcelain mosaic, natural stone mosaic, pebbles, etc.) are bonded and grouted 20. The central area of the central sheet includes a pan core 23b sandwiched between an upper composite layer 22c and lower composite layer 22d (FIG. 4). The pan core 23b consists of a lightweight, mold-resistant, watertight material (urethane foam, polystyrene foam, etc.), thicker than that used for panels. The top of the pan core is contoured to cause water to flow to the position at which the drain is located, in accordance with required building codes (FIG. 5a). Flanges 27a, 27b, 27c, fabricated from a high strength watertight material (aluminum, steel, etc.) are bonded to the upper back, left and right edges of the shower pan 19 (FIGS. 5a and 5b). The flanges 27a, 27b, 27c have locating screws 33 attached at regular intervals along their horizontal surface (FIG. 5b, 5c), with the locating screws 33 inserted through the flange 27a, 27b or 27c, minimally penetrating into the pan core 23b and sealed with an appropriate adhesive (epoxy resin, silicone, etc.). Locating screws 33 are standard pan head screws, made of a non-corrosive and non-rusting material (stainless steel, etc.) The locating screws 33 are positioned to mate with the oval holes 31 on back bottom panel 10 and side bottom panels 11 and 12 during installation (FIG. 12). The upper composite layer 22c and lower composite layer 22d consist of high-strength cloth (fiberglass, bamboo, basalt, etc.) impregnated with bonding agent (epoxy resin, polyester resin, etc.). The upper composite layer 22c is impregnated with a bonding agent appropriate for providing both structural integrity and for securing the finish pieces 21b to the completed central sheet and can include two layers of high-strength cloth with extra bonding agent to provide greater strength. The lower composite layer 22d is impregnated with a bonding agent appropriate for providing structural integrity to the completed central sheet and may be comprised of a higher strength cloth and greater concentration of bonding agent, to provide greater strength and allow the pan to sit securely on the foundation of the shower unit at the installation site. The upper layer is applied on top of the pan core and partially covering the horizontal portion of the flanges 27a, 27b, 27c, and extends additionally down the front vertical surface of the shower pan 19. An additional composite layer 22e is applied to all the side and back vertical surfaces of the pan, extending up to the height of the top of the flanges 27a, 27b, 27c (FIG. 6). For curbed pans, an additional length of curb core 23c is adhered along the front edge of the tray leaving a gap 26 between the edges of curb core 23c and the flanges 27b and 27c. The upper composite layer 22c is then applied to extend additionally over the curb core 23c (FIG. 7). A cylindrical hole 25a, whose diameter matches the standard for shower drains, is cut through the pan core 23b coincident with the location of the drainpipe at the ultimate installation site, and a shower module drain 25b, is inset into the pan core 23b (FIG. 8a). Drain 25b is fused and sealed with the core with drain fitting bonding agent 25c (epoxy resin, polyester resin, etc.) (FIG. 8b). The finish pieces 21b are laid out and adhered in the desired configuration to the pan while it is on an even, level surface in a controlled environment. A gap 26 is left between the outer edges of the finish piece 21b area and the shower pan flanges 27a, 27b, 27c. The gap is equal in width to the thickness of the panel backing sheets, plus a tolerance, to allow the backing sheets of panels 10, 11 and 12 to slot into the gap 26 of the shower pan 19 (FIG. 9a). For curbed trays, the shower tray finished curb 42 may be tiled with finish pieces 21a or 21b that match the walls or the tray (FIG. 1c). The finish pieces 21a or 21b extend to the edge of the curb core 23c, and gap 26 allows the backing sheets of panels 11 and 12 to slot into place between the end of the finished curb 42 and the shower pan flanges 27b and 27c (FIG. 9b). The interstitial gaps between finish pieces 21b are grouted 20 after the tiles have been adhered and while the pan is still lying flat. The stages of pan manufacturing may be achieved by hand or with the aid of machinery and tooling and may occur in one or multiple phases.

SHOWER PAN IMPLEMENTATION: A thin layer of mortar cement is applied to the floor area ready to accept the pan. The shower pan 19 is lowered onto the floor, and aligned so that the drain 25b is collinear with the drainage pipe. The drain 25b is fitted and sealed to the drainage pipe. Waterproof adhesive (silicone etc.) is applied in gap 26 and along the inside of the flanges 27a, 27b and 27c in preparation to accept the bottom panels 10, 11 and 12.

Individual Panel Specific Features and Implementation.

Figure 10:
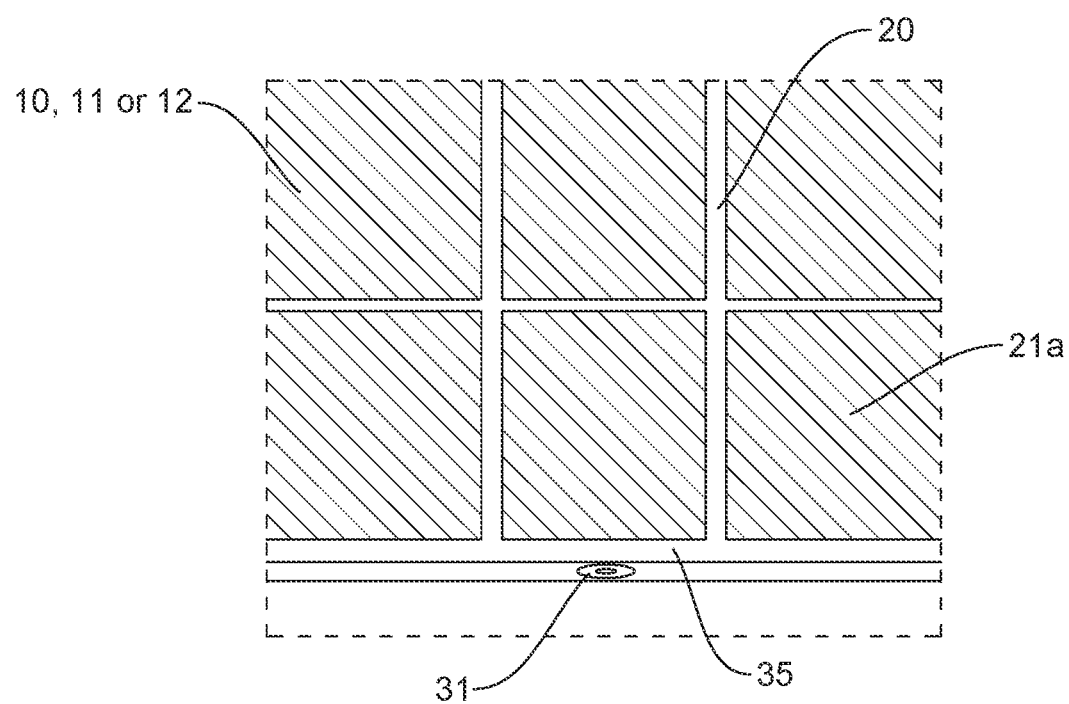
FIG. 10 is a front view of a bottom panel showing a narrow bottom edge, according to an exemplary embodiment of the present invention.
Figure 11A:
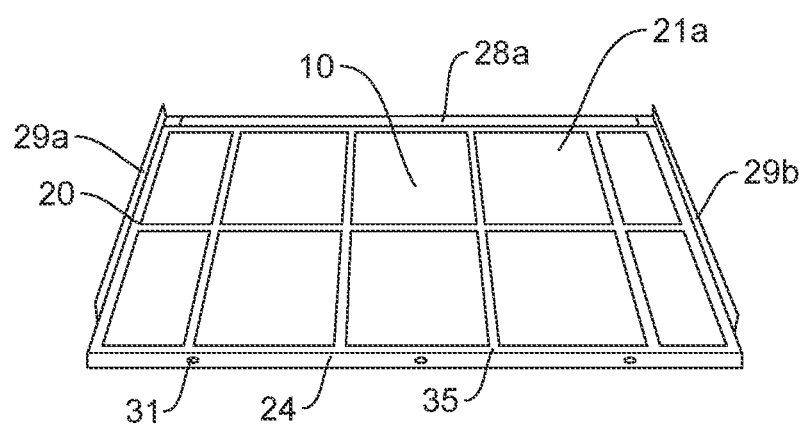
FIG. 11a is a perspective view of a back bottom panel showing the placement of oval holes along the panel edge framing, according to an exemplary embodiment of the present invention.
Figure 11B:
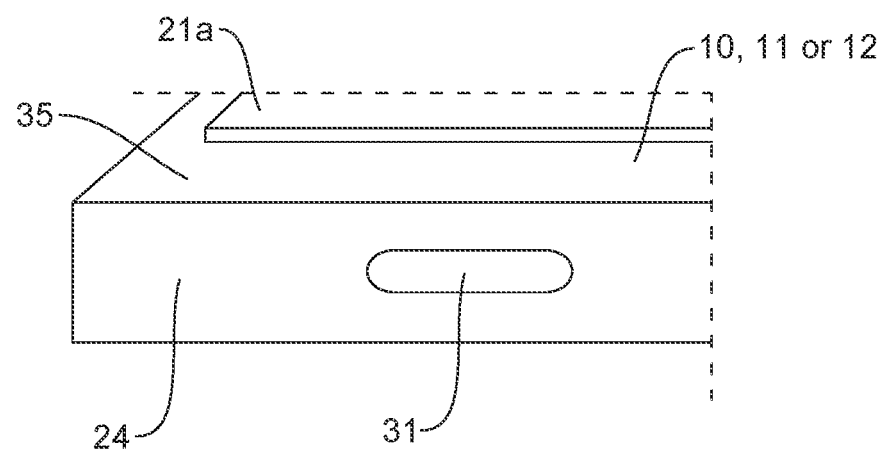
FIG. 11b is a close-up perspective view of a back bottom panel showing the oval holes, according to an exemplary embodiment of the present invention.
Figure 13:
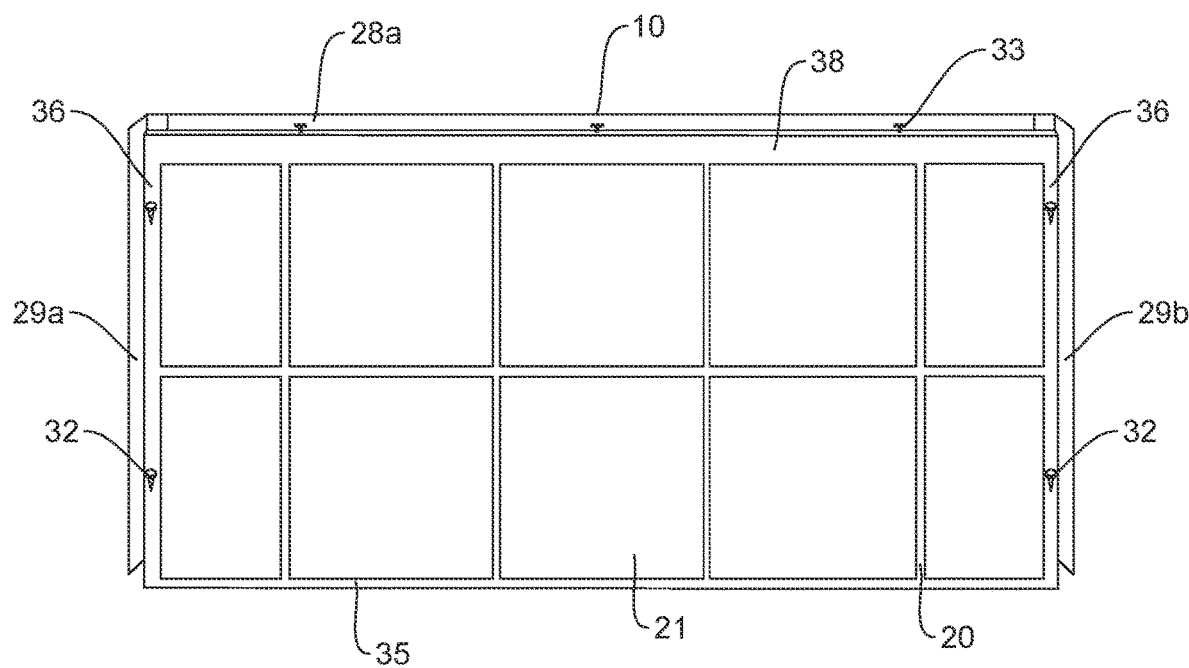
FIG. 13 is a front perspective view of a back bottom panel showing configuration of the edges, according to an exemplary embodiment of the present invention.
Figure 14:
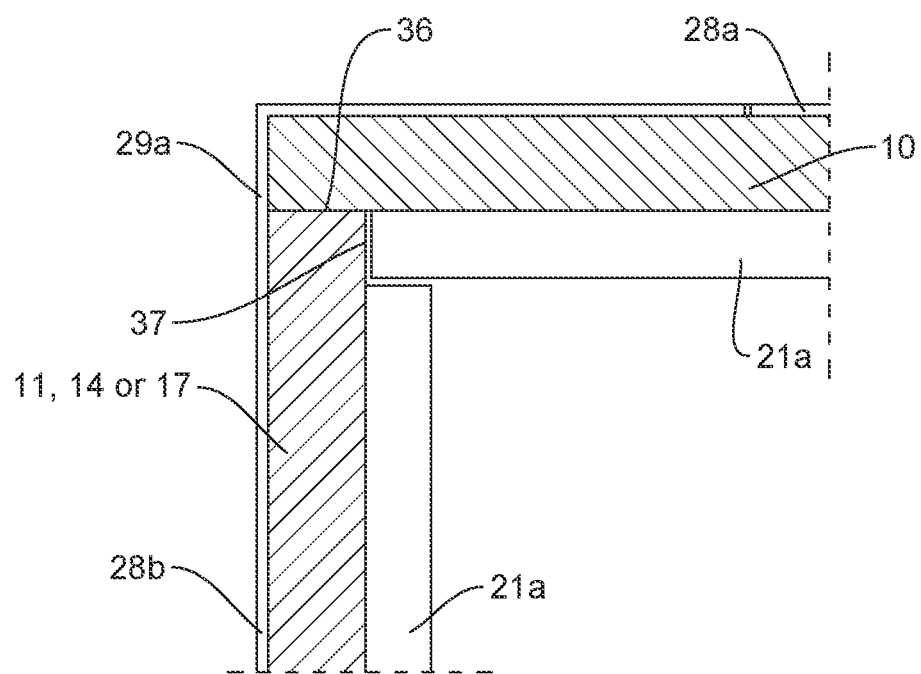
FIG. 14 is a top view of a mated back panel and side panel at an inter-panel orthogonal edge configuration showing the connection between a wide side edge and narrow side edge, according to an exemplary embodiment of the present invention.
Figure 15:
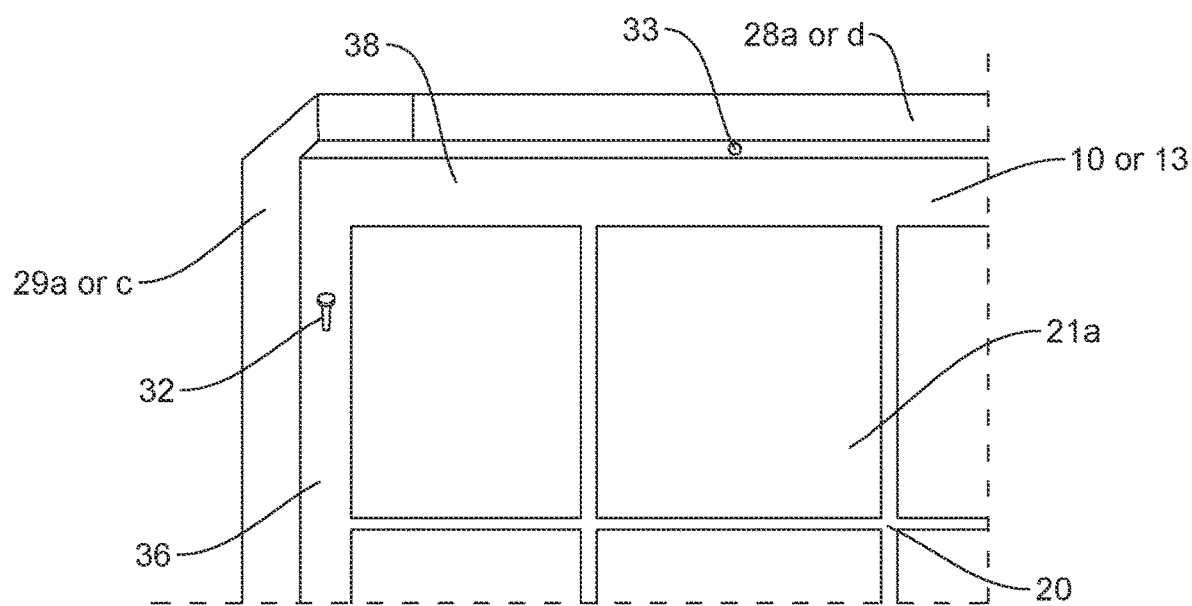
FIG. 15 is a front isometric view of a back bottom or middle panels showing the keyhole and features at its left side and top edges, according to an exemplary embodiment of the present invention.
Figure 16:
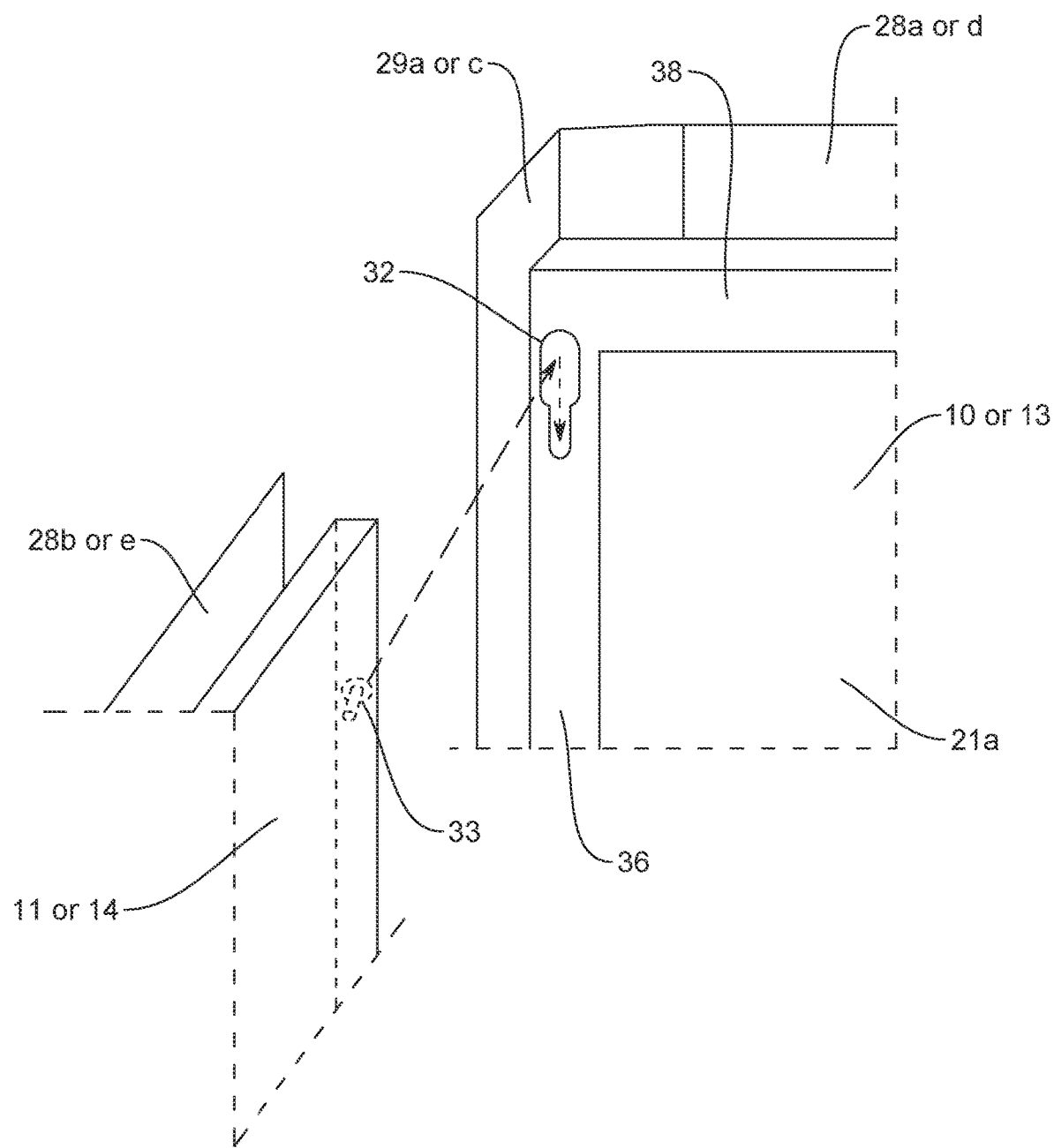
FIG. 16 is an isometric and enlarged view of a back bottom or middle panel and side bottom or middle panel showing the meeting of locating screws and keyholes, according to an exemplary embodiment of the present invention.
Figure 17:
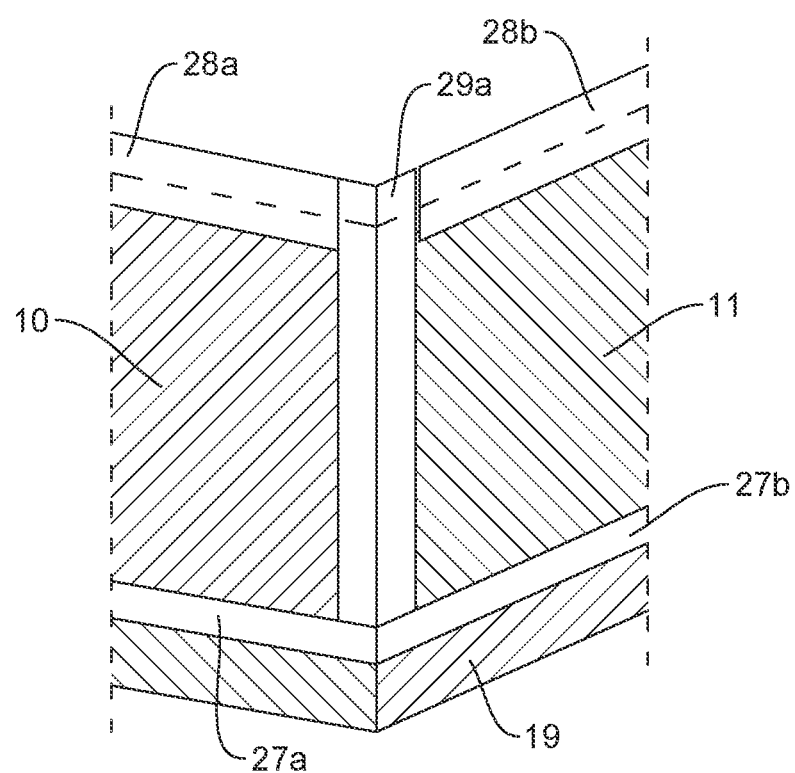
FIG. 17 is an isometric, corner back view of a mated back bottom panel, left bottom panel, and a shower pan showing the flanges, edge lips and corner lips, according to an exemplary embodiment of the present invention.
Figure 18:
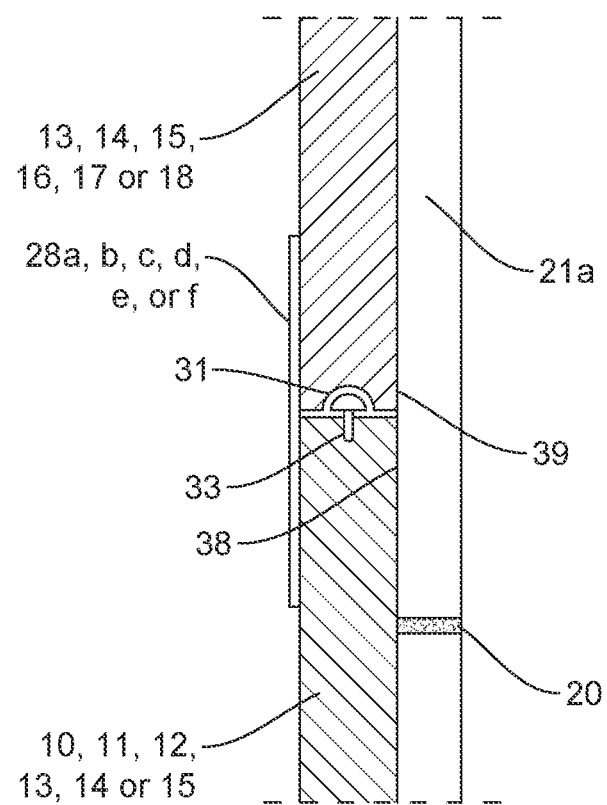
FIG. 18 is a cross-sectional view of two panels at an inter-panel horizontal coplanar edge configuration showing the mating and alignment of the top and bottom mating edges, according to an exemplary embodiment of the present invention.
Figure 19:
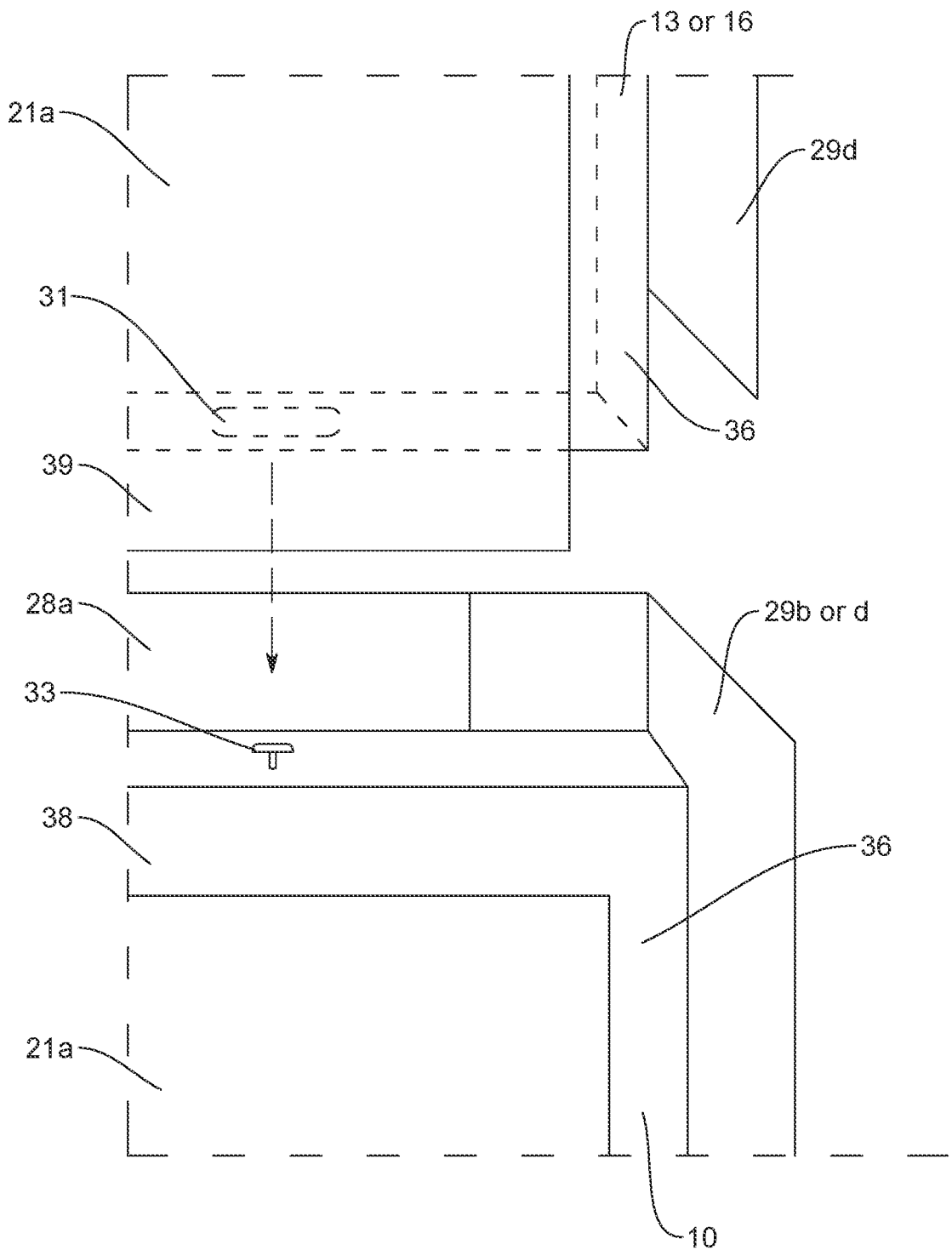
FIG. 19 is an isometric, close up view of a back bottom or middle panel and back middle or top panel showing the meeting of locating screws and oval holes, according to an exemplary embodiment of the present invention.

BACK BOTTOM PANEL: The back bottom panel 10 mates with the shower pan 19, left bottom panel 11, right bottom panel 12 and back middle panel 13 (FIGS. 1a and 1b). The lower horizontal edge of back bottom panel 10 features a narrow bottom mating edge 35 (FIG. 10); with the finish pieces 21a recessed from the edge of the backing sheet. This allows for the backing sheet to fit into the gap 26 between the edge of the shower pan flange 27a (L-shape) and its adjacent finish pieces 21b, with the finish pieces 21a overlapping the finish pieces 21b (FIG. 9a). Oval holes 31 are cut at regular intervals though the bottom of the panel edge framing 24 along the narrow bottom mating edge 35 (FIGS. 10, 11a and 11b) to mate with the locating screws 33 on the shower pan flange 27a, for accurate and secure alignment of back bottom panel 10 during installation (FIG. 12). Oval holes 31 are shaped to allow a panel to have some movement from left to right during installation, but not allow movement in a front to back direction. Once installed, side to side motion is prevented by the attachments at the top of the panel to the framing studs, and forwards to backwards motion is prevented by the locating screws 33 and oval holes 31. Both side edges of back bottom panel 10 feature a wide side mating edge 36; with finish pieces 21a recessed from the backing sheet (FIGS. 13 and 15). The finish pieces 21a are recessed to correspond with the thickness of a backing sheet, plus a tolerance, to allow for the narrow side mating edges 37 of left bottom panel 11 and right bottom panel 12 to fit into and be adhered to the wide side mating edges 36 of back bottom panel 10 (FIG. 14). Both wide side mating edges 36 have keyhole holes 32 cut at regular intervals through the front surface of the panel edge framing 24 (including through the upper composite layer 22a which extends over the panel edge framing 24) ready to accept the locating screws 33 on the narrow side mating edges 37 of left bottom panel 11 and right bottom panel 12 during installation (FIGS. 15 and 16). Keyhole holes 32 are shaped to allow a locating screw 33 to easily enter the wide top of the keyhole and subsequently slide down into the narrow bottom of the keyhole during installation. Once the side bottom panels 11 and 12 are attached to back bottom panel 10, their forwards to backwards motion and sideways motion are prevented by the locating screws 33 positioned within the narrow bottom of the keyhole holes 32. Corner lips 29a and 29b, fabricated from a high strength watertight material (aluminum, cloth resin composite, steel, etc.) are bonded to the wide side mating edges 36 of back bottom panel 10 (FIG. 13). The corner lips 29a and 29b start from a height that corresponds with the top of the shower pan flanges 27a, 27b and 27c, and end at the same height as the edge lip 28a at the top of back bottom panel 10 (FIGS. 13, 15 and 17). The top of back bottom panel 10 features a top mating edge 38; with finish pieces 21a recessed from the edge of the backing sheet (FIG. 13). The gap created is equal to the amount of overhang of finish pieces 21a on back middle panel 13, plus an extra tolerance equaling the width of a grout line, so that when the bottom mating edge 39 of back middle panel 13 is attached to the top mating edge 38 of back bottom panel 10 during installation, an interlocking connection is formed and the resulting pattern of finish pieces and interstitial spaces is consistent (FIG. 18). Locating screws 33 are attached at intervals along the top edge of the panel edge framing 24 on the top mating edge 38 of back bottom panel 10 (FIGS. 13 and 15), positioned to mate with the oval holes 31 on back middle panel 13 during installation (FIGS. 18 and 19). The locating screws 33 are inserted through the panel edge framing 24, minimally penetrating the panel core 23a and are sealed with an appropriate adhesive. An edge lip 28a, fabricated from a high strength watertight material (aluminum, cloth resin composite, steel, etc.), is bonded along the back side of the top mating edge 38 (FIGS. 13 and 15). The edge lip 28a runs the horizontal length of the panel from the point on both sides where it meets the corner lips 29a and 29b (FIGS. 15 and 17). The joints between the edge lip 28a and corner lips 29a and 29b are bonded with a suitable adhesive (epoxy resin, silicone etc.). Locations along the edge lip 28a of the top mating edge 38 may be pre-drilled so that, during installation, flat-headed screws can be screwed through the edge lip 28a into the framing studs to securely attach the panel; alternatively, the holes can be drilled in situ. In situ, the narrow bottom mating edge 35 of back bottom panel 10 meets and is adhered to gap 26 on the shower pan 19 and the shower pan flange 27a with appropriate waterproof adhesive (silicone sealant etc.), which also serves to seal the joint between back bottom panel 10 and shower pan 19. The locating screws 33 on the shower pan flange 27a mate with the oval holes 31 on back bottom panel 10 to secure the panel in its correct location and alignment. Back bottom panel 10 is attached to the framing studs via screws screwed through the edge lip 28a along its top mating edge 38. Screws used for installation of panels are countersunk flat headed screws, ensuring that once screwed in, the head will be flush with the surface of the flange or lip. They can also be coated in waterproof adhesive before being screwed in and, once in, the area around the head of the screw can also be covered with waterproof adhesive (silicone etc.). The joints where the corner lips 29a and 29b on back bottom panel 10 meet the shower pan flanges 27b and 27c are sealed with waterproof adhesive. Waterproof adhesive is also applied along the top mating edge 38 ready to receive and seal the joint with back middle panel 13 and down both wide side mating edges 36 ready to receive and seal the joint with left bottom panel 11 and right bottom panel 12.

LEFT BOTTOM PANEL 11. Left bottom panel 11 mates with the shower pan 19, back bottom panel 10 and left middle panel 14 (FIGS. 1a and 1b). As with back bottom panel 10, the lower horizontal edge of left bottom panel 11 features a narrow bottom mating edge 35 with finish pieces 21a recessed (FIGS. 10 and 20a), to mate with the shower pan 19 (FIG. 9a). For curbed pans, there is a narrow bottom mating edge variation 35(b) with the front tile cut to sit over the curb (FIGS. 9b and 20c). Left bottom panel 11 features the oval holes 31 along its narrow bottom mating edge 35 (FIGS. 10 and 11b) ready to mate with the locating screws 33 on the shower pan flange 27b during installation (FIG. 12).

Figure 20A:
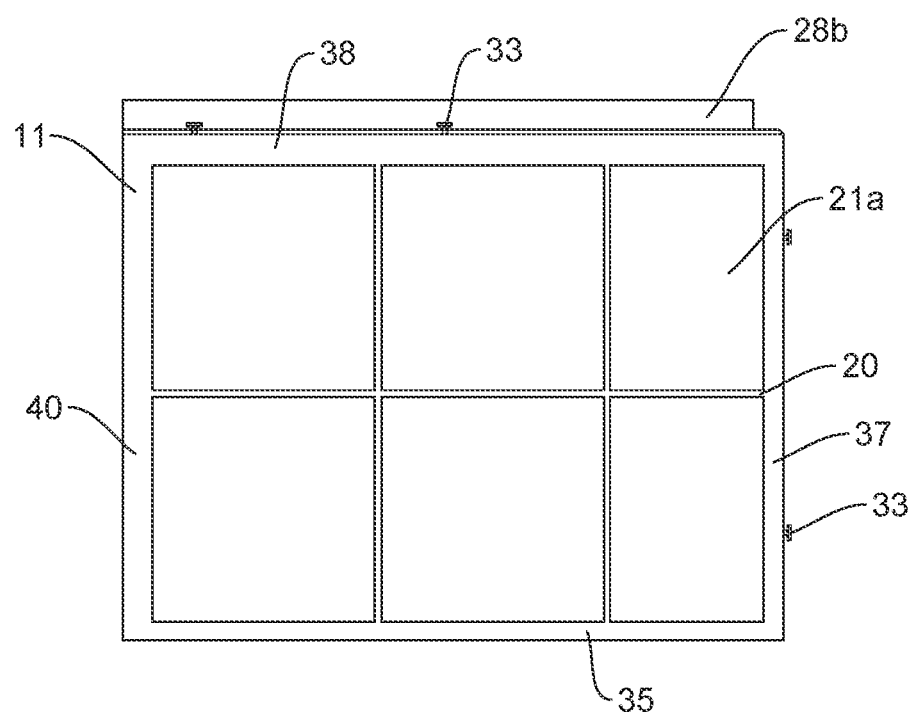
FIG. 20a is a front view of a left bottom panel showing its gapped finish edge, narrow bottom edge, narrow side edge, and top mating edge, according to an exemplary embodiment of the present invention.
Figure 20B:
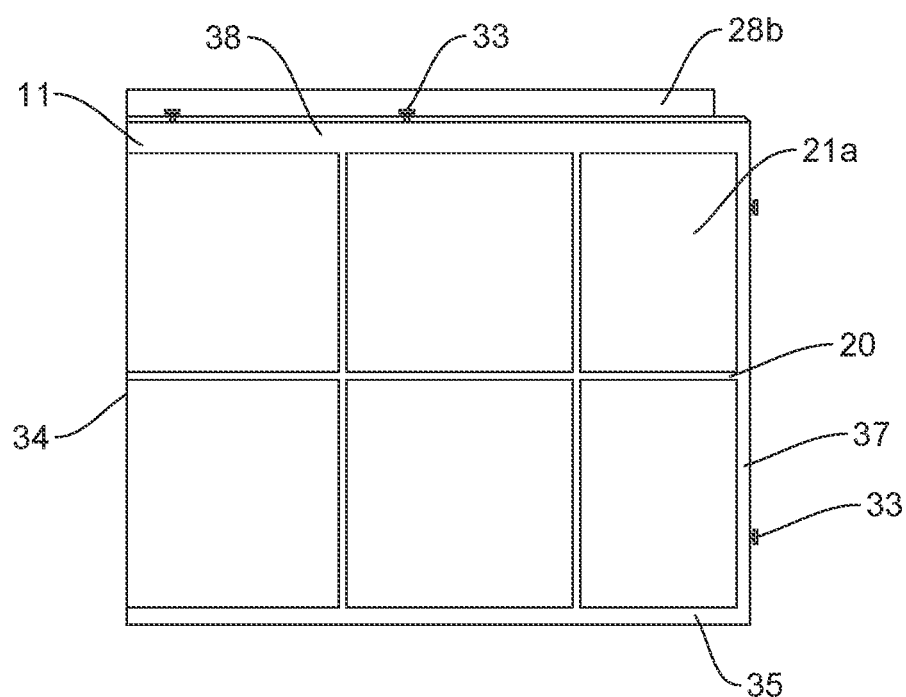
FIG. 20b is a front view of a left bottom panel showing its alternative flush edge, narrow bottom edge, narrow side edge, and top mating edge, according to an exemplary embodiment of the present invention.
Figure 20C:
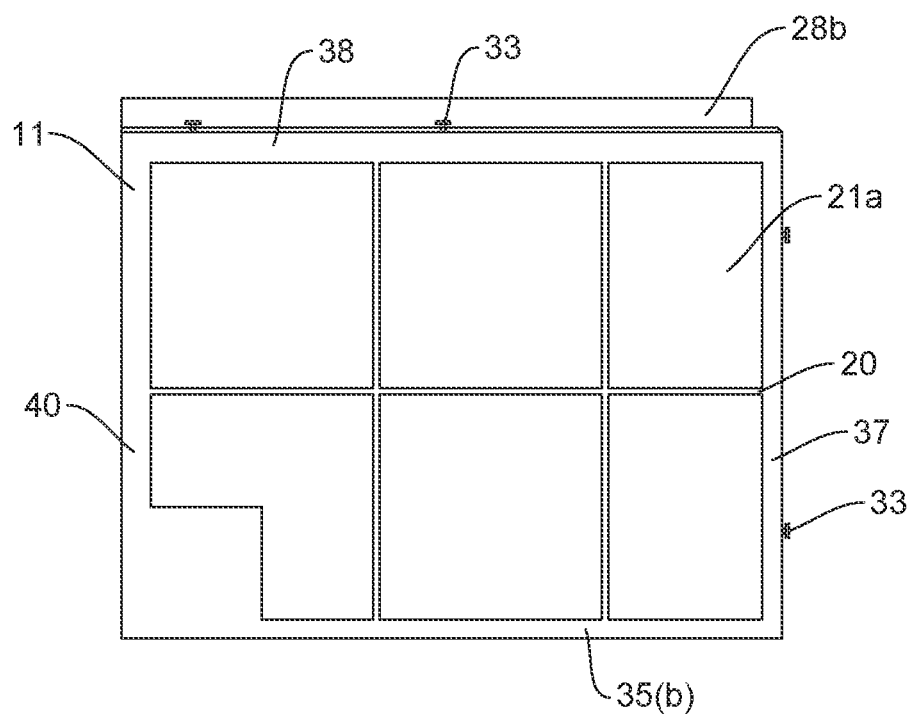
FIG. 20c is a front view of a left bottom panel with gapped finish edge showing its narrow bottom edge variation for meeting a curbed shower pan, according to an exemplary embodiment of the present invention.
Figure 20D:
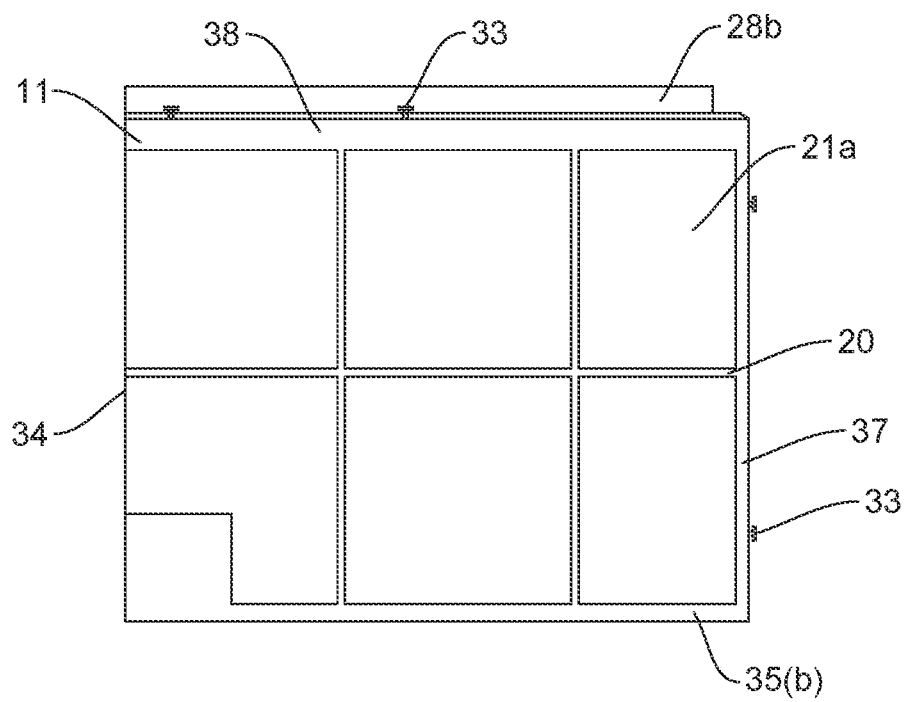
FIG. 20d is a front view of a left bottom panel with flush edge showing the narrow bottom edge variation for meeting a curbed shower pan, according to an exemplary embodiment of the present invention.

The back vertical edge of left bottom panel 11 (that meets back bottom panel 10) features a narrow side mating edge 37; with finish pieces 21a recessed from the backing sheet (FIG. 20a). The finish pieces 21a are recessed to correspond with the thickness of the finish pieces 21a on the back bottom panel 10, plus a tolerance equaling the width of a grout line, to allow for the backing sheet of left bottom panel 11 to meet and be adhered to the backing sheet of back bottom panel 10 and the finish pieces 21a on the narrow side mating edge 37 of left bottom panel 11 to overlap the finish pieces 21a on the left wide side mating edge 36 of back bottom panel 10 during installation (FIG. 14). Locating screws 33 are attached at regular intervals down the side surface of the panel edge framing 24, minimally penetrating into the panel core 23a, of the narrow side mating edge 37, ready to mate with the keyhole holes 32 on back bottom panel 10 and secure the panel in its correct location and alignment during installation (FIG. 16). The locating screws 33 may be adjustable so they can be tightened or loosened to allow for easier fitting. However, they are generally fully tightened at the point of final installation to ensure the correct alignment of left bottom panel 11. The front vertical edge of left bottom panel 11 features either a gapped finish edge 40 (FIG. 20a) or a flush edge 34 (FIG. 20b); with finish pieces 21a either ending recessed from or flush with the edge of the backing sheet, depending on installation requirements (e.g., whether the bathroom wall will extend outwards at a zero angle from the surround, or turn at an angle at the absolute edge of the surround). As with back bottom panel 10, the top of left bottom panel 11 features a top mating edge 38 with finish pieces 21a recessed (FIGS. 18 and 20a). Locating screws 33 are inserted at intervals along the top mating edge 38 of left bottom panel 11, ready to mate with the oval holes 31 along the bottom mating edge 39 of back middle panel 14 (FIG. 18). An edge lip 28b runs horizontally along the back side of the top mating edge 38 from the front to a point near the back where it will meet the corner lip 29a of back bottom panel 10 during installation (FIGS. 17 and 20a). Locations along the edge lip 28a of the top mating edge 38 may be pre-drilled ready for installation, alternatively the holes can be drilled in situ. In situ, the narrow bottom mating edge 35 of left bottom panel 11 meets and is adhered to gap 26 on the shower pan 19 and the shower pan flange 27b with waterproof adhesive. The locating screws 33 on the shower pan flange 28b mate with the oval holes 31 on the narrow bottom mating edge 35 of left bottom panel 11 to secure the panel in its correct location and alignment. The locating screws 33 on the narrow side mating edge 37 of left bottom panel 11 enter the top of the keyhole holes 32 on the left wide side mating edge 36 of back bottom panel 10 and, as the panel is lowered into place, the locating screws 33 drop into the bottom of the keyhole holes 32 to secure the panel in its correct location and alignment. The joint is adhered and sealed with waterproof adhesive. The edge lip 28b of left bottom panel 11 meets and is adhered to the corner edge lip 29a of back bottom panel 10. Left bottom panel 11 is attached to the framing studs via screws screwed through the edge lip 28b along its top mating edge 38. Waterproof adhesive is applied along the top mating edge 38 ready to receive and seal the joint with left middle panel 14.

RIGHT BOTTOM PANEL 12. Right bottom panel 12 mates with the shower pan 19, back bottom panel 10 and right middle panel 15 (FIGS. 1a and 1b). It is a mirror image of left bottom panel 11, in both its composition and mode of implementation.

Figure 21:
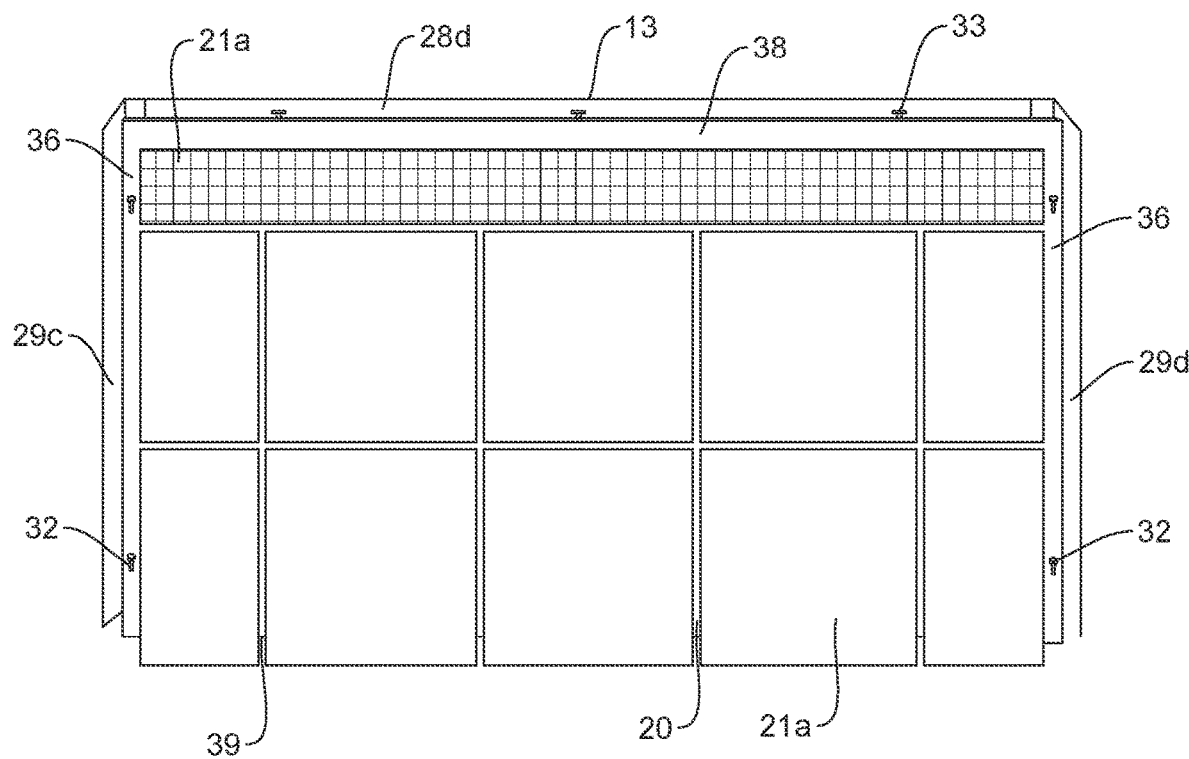
FIG. 21 is a front perspective view of a back middle panel showing configuration of the edges, according to an exemplary embodiment of the present invention.
Figure 22:
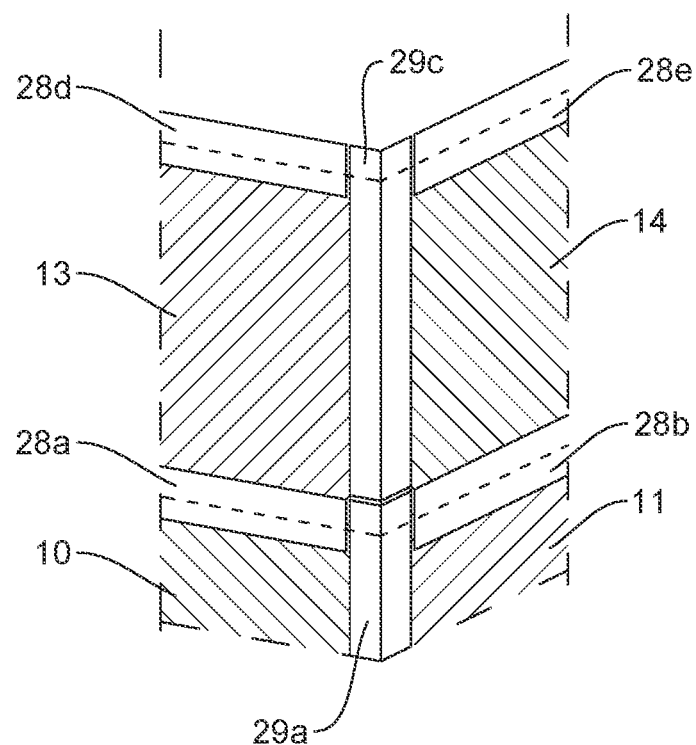
FIG. 22 is an isometric, corner back view of a back bottom, left bottom, back middle and left middle panels showing the edge lips and corner lips, according to an exemplary embodiment of the present invention.

BACK MIDDLE PANEL 13: The back middle panel 13 mates with back bottom panel 10, left middle panel 14, right middle panel 15 and back top panel 16 (FIGS. 1a and 1b). The lower horizontal edge of back middle panel 13 features a bottom mating edge 39; with finish pieces 21a overhanging the backing sheet (FIGS. 18 and 21). The overhang is equal to the gap along the top mating edge 38 of back bottom panel 10, minus the width of a grout line, so that when back middle panel 13 is attached to back bottom panel 10, an interlocking connection is formed, and the resulting pattern of finish pieces and interstitial spaces is consistent (FIG. 18). Back middle panel 13 features the oval holes 31 on its bottom mating edge 39, positioned to accept the locating screws 33 on back bottom panel 10 during installation (FIGS. 18 and 19). As with back bottom panel 10, both side vertical edges of back middle panel 13 feature a wide side mating edge 36 with finish pieces 21a recessed, and keyhole holes 32 (FIGS. 15 and 21) positioned to accept the locating screws 33 on left middle panel 14 and right middle panel 15 during installation (FIG. 16). Corner lips 29c and 29d, are bonded to both wide side mating edges 36 of back middle panel 13 (FIG. 21). The corner lips 29c and 29d start from a height that corresponds with the top of the corner lips 29a and 29b on bottom panel 10 and extend to the top of edge lip 28d at the top of back middle panel 13 (FIGS. 21 and 22). The top of back middle panel 13 features a top mating edge 38 with finish pieces 21a recessed and locating screws 33

(FIG. 21) positioned to receive back top panel 16 (FIGS. 18 and 19). An edge lip 28d, is bonded to the back side along the top mating edge 38 of back middle panel 13 (FIG. 21). The edge lip 28d runs the horizontal length of the panel from the point on both sides where it meets the corner lips 29c and 29d (FIGS. 15 and 22). The joints between the edge lip 28d and corner lips 29c and 29d are bonded with a suitable adhesive. Locations along the edge lip 28d may be pre-drilled ready for installation. In situ, the bottom mating edge 39 of back middle panel 13 meets and is adhered to the top mating edge 38 of back bottom panel 10 with waterproof adhesive. The locating screws 33 on back bottom panel 10 mate with the oval holes 31 on back middle panel 13 to secure the panel in its correct location and alignment. Back middle panel 13 is attached to the framing studs via screws screwed through the edge lip 28d along its top mating edge 38. The joint where the corner lips 29c and 29d on back middle panel 13 meet the corner lips 29a and 29b of back bottom panel 10 are sealed with waterproof adhesive. Waterproof adhesive is also applied along the top mating edge 38 ready to receive and seal the joint with back top panel 16 and down both wide side mating edges 36 ready to receive and seal the joint with left middle panel 14 and right middle panel 15.

Figure 23A:
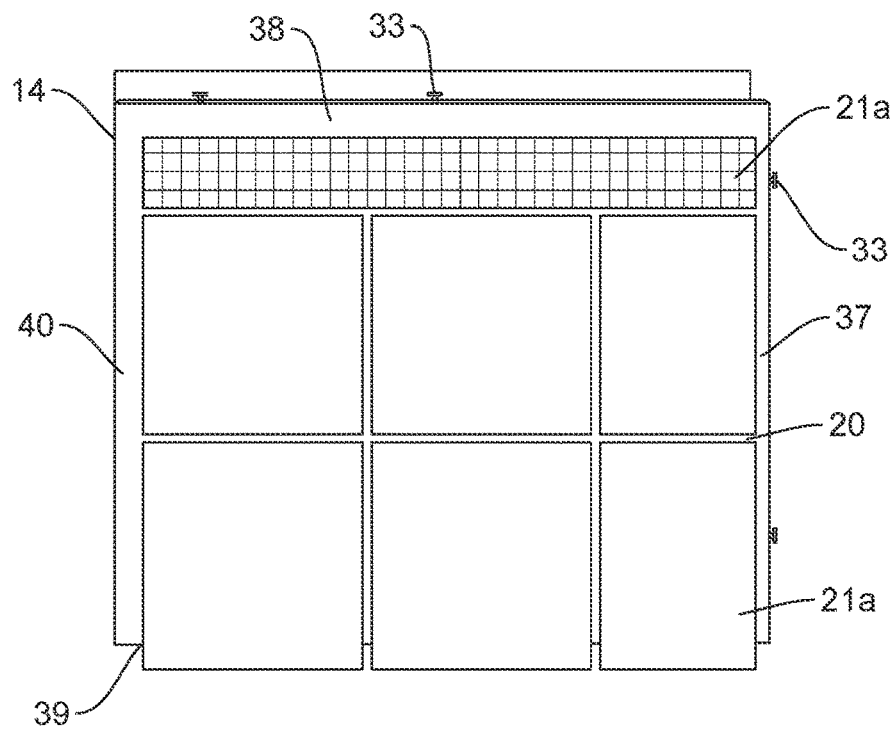
FIG. 23a is a front view of a left middle panel showing its gapped finish edge, bottom mating edge, narrow side edge and top mating edge, according to an exemplary embodiment of the present invention.
Figure 23B:
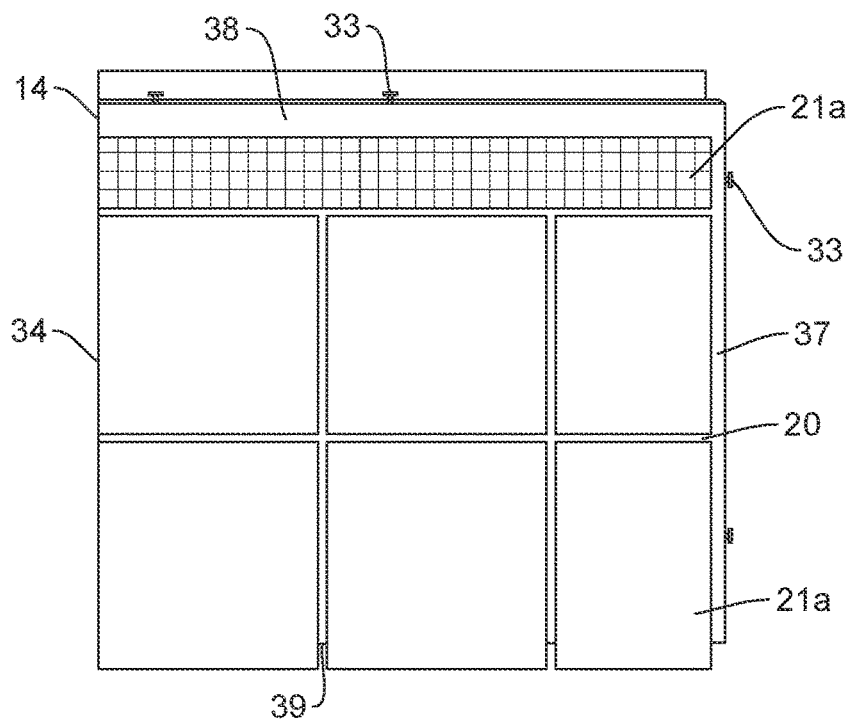
FIG. 23b is a front view of a left middle panel showing the alternative flush edge, bottom mating edge, narrow side edge and top mating edge, according to an exemplary embodiment of the present invention.
Figure 24:
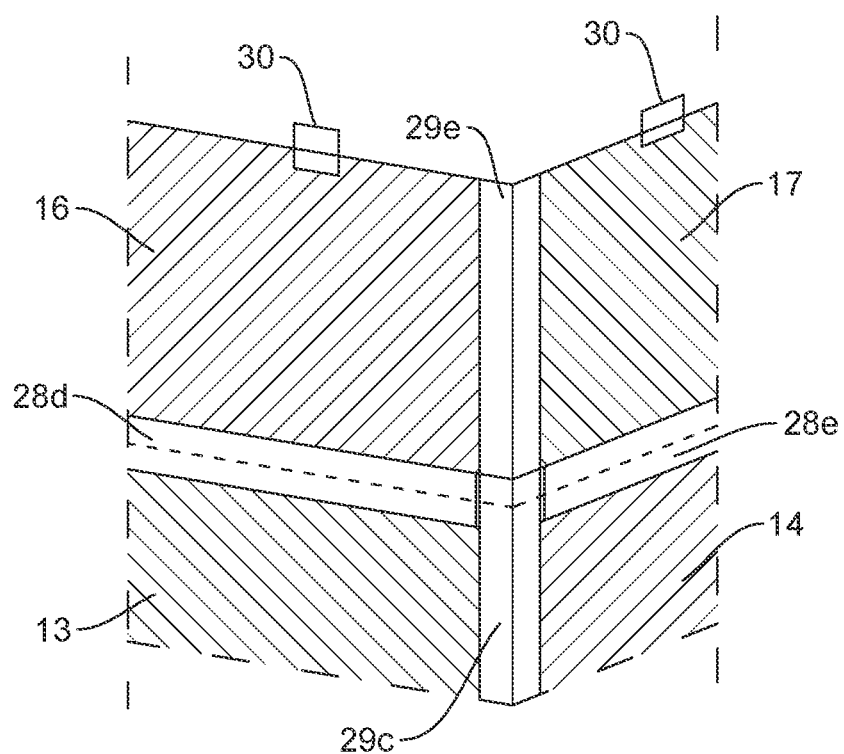
FIG. 24. An isometric, corner back view of a back middle, left middle, back top and left top panels, illustrating their edge lips, corner lips and tabs.

LEFT MIDDLE PANEL 14: The left middle panel 14 mates with left bottom panel 11, back middle panel 13 and left top panel 17 (FIGS. 1a and 1b). The lower horizontal edge of left middle panel 14 features a bottom mating edge 39 with the finish piece 21a overhang and oval holes 31, ready to accept the locating screws 33 along the top mating edge 38 on left bottom panel 11. (FIGS. 18 and 23a). The back vertical edge of left middle panel 14 (that meets back middle panel 13) features a narrow side mating edge 37 (FIG. 23a) with finish pieces 21a recessed, and locating screws 33 positioned to mate with the keyhole holes 32 on back middle panel 13 (FIG. 16). The front vertical edge of left middle panel 14 features either a gapped finish edge 40 (FIG. 23a) or a flush edge 34 (FIG. 23b), depending on installation requirements. The top of left middle panel 14 features a top mating edge 38 (FIGS. 18 and 23a) with finish pieces 21a recessed and locating screws 33 ready to receive left top panel 17 during installation. An edge lip 28e is bonded to the back side along the top mating edge 38 of left middle panel 14 (FIG. 23a). The edge lip 28e runs horizontally along the panel from the front to a point near the back where it will meet the corner lip 29c of back middle panel 13 during installation (FIGS. 23a and 24).

Locations along the edge lip 28c may be pre-drilled ready for installation. In situ, the bottom mating edge 39 of left middle panel 14 meets and is adhered to the top mating edge 38 of left bottom panel 11 with waterproof adhesive. The locating screws 33 on left bottom panel 11 mate with the oval holes 31 on left middle panel 14, to secure the panel in its correct location and alignment. The locating screws 33 on the narrow side mating edge 37 of left middle panel 14 mate with the keyhole holes 32 on the left wide side mating edge 36 of back middle panel 13 to secure the panel in its correct location and alignment, and the joint is adhered and sealed with waterproof adhesive. The edge lip 28e of left middle panel 14 meets and is adhered to the corner edge lip 29c of back middle panel 13. Left middle panel 14 is attached to the framing studs via screws screwed through the edge lip 28e along its top mating edge 38. Waterproof adhesive (silicone etc.) is applied along the top mating edge 38 ready to receive and seal the joint with left top panel 17.

RIGHT MIDDLE PANEL 15. Right middle panel 15 mates with right bottom panel 12, back middle panel 13 and right top panel 18 (FIGS. 1a and 1b). It is a mirror image of left middle panel 14, in both its composition and mode of implementation.

Figure 25:
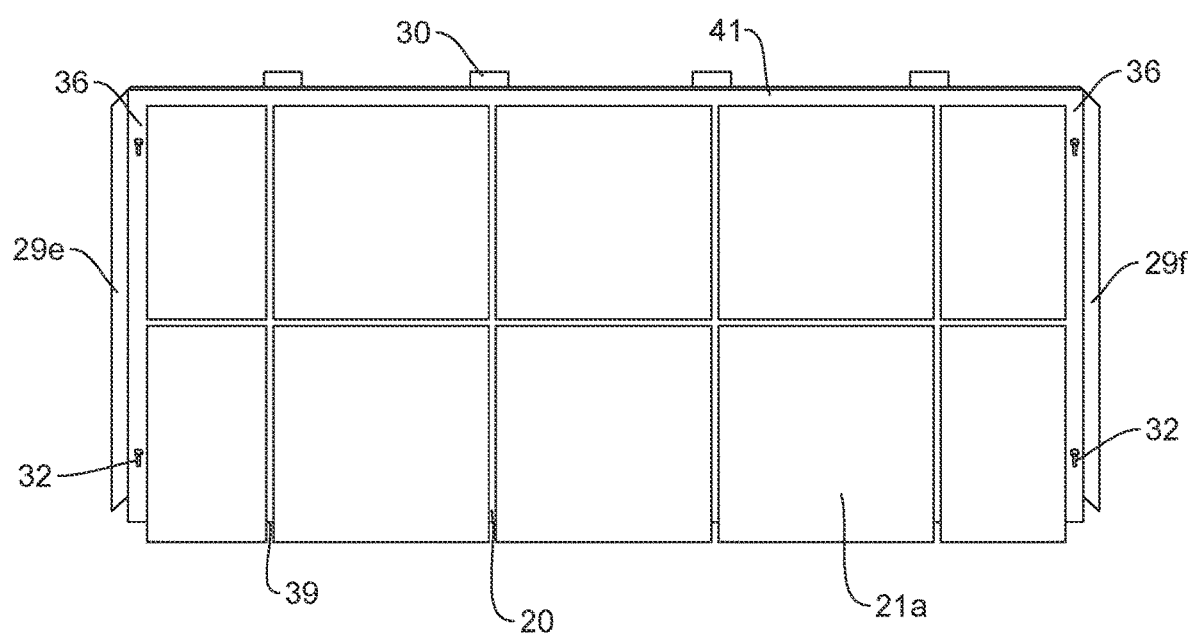
FIG. 25. A front perspective view of a back top panel, illustrating its edge configurations.

BACK TOP PANEL 16: Back top panel 16 mates with back middle panel 13, left top panel 17 and right top panel 18 (FIGS. 1a and 1b). As with back middle panel 13, the lower horizontal edge of back top panel 16 features a bottom mating edge 39 with finish piece 21a overhang, and oval holes 31 ready to accept the locating screws 33 on back middle panel 13 during installation (FIGS. 18, 19 and 25). Both side vertical edges of back top panel 16 feature a wide side mating edge 36 with finish pieces 21a recessed, and keyhole holes 32 (FIG. 25), ready to accept the locating screws 33 on left top panel 17 and right top panel 18. Corner lips 29e and 29f, are bonded to both wide side mating edges 36 of back top panel 16 (FIG. 25). The corner lips 29e and 29f start from a height that corresponds with the top of the corner lips 29c and 29d of back middle panel 13 and extend to the top of back top panel 16 (FIG. 24). The top of back top panel 16 features a top finish edge 41, with finish pieces 21a recessed from the edge of the backing sheet (FIG. 25). Tabs 30 are bonded at intervals to the back side along the top mating edge 38 of back top panel 13 (FIGS. 24 and 25). The tabs 30 are bonded with waterproof adhesive and with countersunk flat headed screws. The tabs 30 may be pre-drilled so that, during installation, screws can be screwed through the tabs into the framing studs. In situ, the bottom mating edge 39 of back top panel 16 meets and is adhered to the top mating edge 38 of back middle panel 13 with waterproof adhesive. The locating screws 33 on back middle panel 13 mate with the oval holes 31 on back top panel 16. Back top panel 16 is attached to the framing studs via screws screwed through the tabs 30 along its top finish edge 41. The joints where the corner lips 29e and 29f on back top panel 16 meet the corner lips 29c and 29d of back middle panel 13 are sealed with waterproof adhesive. Waterproof adhesive is also applied down both wide side mating edges 36 ready to receive and seal the joint with left top panel 17 and right top panel 18.

Figure 26A:
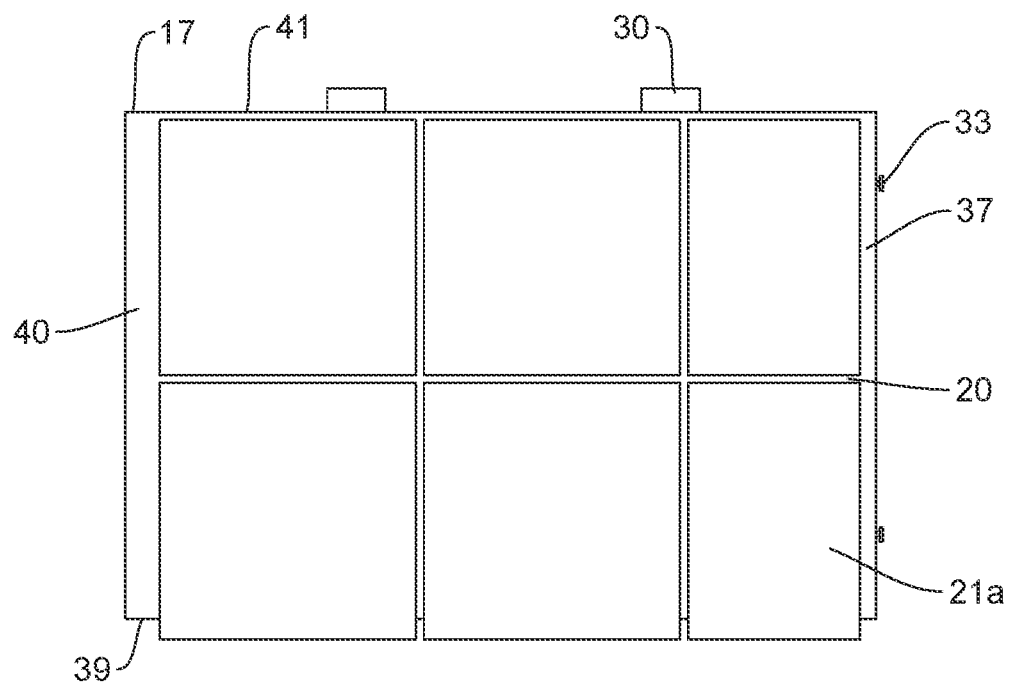
FIG. 26a. A front view of a left top panel, illustrating its gapped finish edge, bottom mating edge, narrow side edge and top finish edge.
Figure 26B:
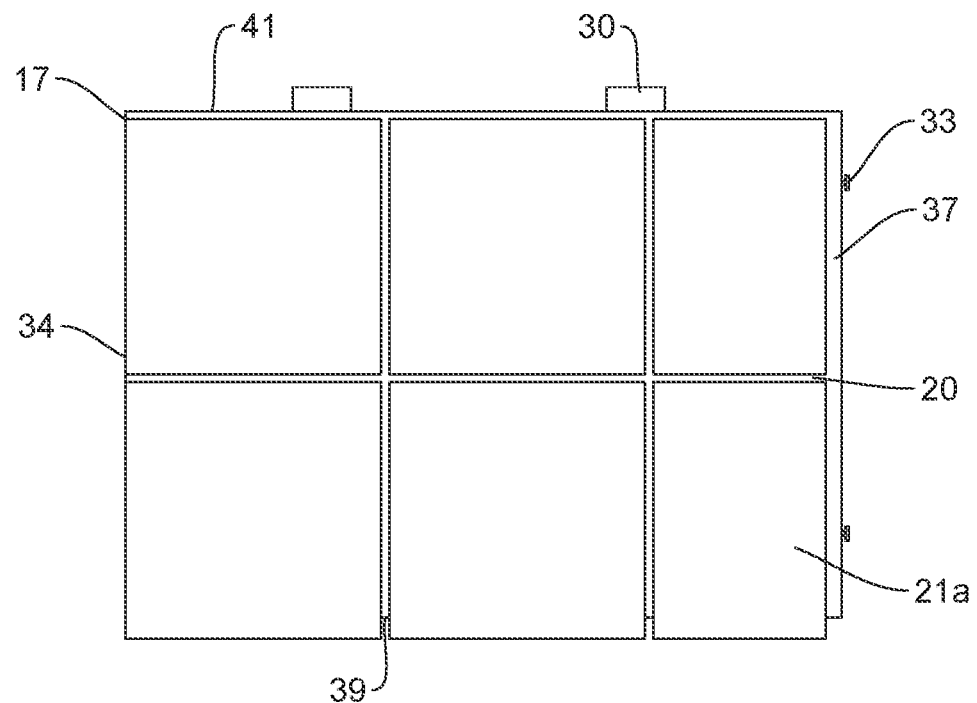
FIG. 26b. A front view of a left top panel, illustrating its alternative flush edge, bottom mating edge, narrow side edge and top finish edge FIG. 27. A cross-section of a bottom panel and bathtub, illustrating the connection between the bottom panels and bathtub.

LEFT TOP PANEL 17: The left top panel 17 mates with left middle panel 14 and back top panel 16 (FIGS. 1a and 1b). As with left middle panel 14, the lower horizontal edge of left top panel 17 features a bottom mating edge 39 with the finish piece 21a overhang, and oval holes 31 (FIG. 26a), ready to accept the locating screws 33 on left middle panel 14 during installation (FIG. 18). The back vertical edge of left top panel 17 (that meets back top panel 16) features a narrow side mating edge 37 with finish pieces 21a recessed, and locating screws 33 (FIG. 26a) ready to mate with keyhole holes 32 of back top panel 16. The front vertical edge of left top panel 17 features either or a gapped finish edge 40 (FIG. 26a) or a flush edge 34 (FIG. 26b). The top of left top panel 17 features a top finish edge 41 (FIG. 26a). Tabs 30 are attached at intervals along the top finish edge 41 (FIGS. 24 and 26a). In situ, the bottom mating edge 39 of left top panel 17 meets and is adhered to the top mating edge 38 of left middle panel 14 with waterproof adhesive. The locating screws 33 on left middle panel 14 mate with the oval holes 31 on left top panel 17. The locating screws 33 on left top panel 17 mate with the keyhole holes 32 on back top panel 16 and the joint is adhered and sealed with waterproof adhesive. Left top panel 17 is attached to the framing studs via screws screwed through the tabs 30 along its top finish edge 41.

RIGHT TOP PANEL 18: The right top panel 18 mates with right middle panel 15 and back top panel 16 (FIGS. 1a and 1b). It is the mirror image of left top panel 17, in both its composition and mode of implementation.

ADDITIONAL IMPLEMENTATION DETAILS. Holes for fixtures (shower head, faucet etc.) are cut as required during the installation process, with each panel being cut while lying flat, prior to it being installed. After installation is complete the fixtures can be attached and sealed with conventional materials. When the shower pan 19 and all panels 10-18 have been installed, the joints between adjacent panels and between the bottom of the walls (panels 10, 11 and 12) and shower pan 19 are grouted and/or sealed with suitable waterproof sealants. Grout 20 is provided for use on the horizontal joints between panels to match the grout 20 which has already been pre-applied on the panels. Appropriate caulking color-coded to match the grout (silicone caulking, acrylic caulking, etc.), is applied down the vertical corners of the walls (panels 10, 11 and 12) and along the joints where the walls meet the shower pan 19. Conventional walling material (dry wall, mortar cement, etc.) is installed around the shower surround, cut, and fitted to meet the vertical gapped finish edges 40 or flush edges 34 and the horizontal top finish edge 41. The joint between the system edges and the conventional walling material is sealed and finished with conventional wall materials, and can be painted over or have additional ornamentation applied (pencil molding, quarter round finish piece, mosaic, etc.)

ADDITIONAL OPTIONAL FEATURES. The shower pan 19 can feature a curb 42 (FIG. 1c), where the curb 42 of the pan is tiled and the pan sits higher than the surrounding floor area. The shower pan 19 can also be low profile and curb-less; i.e. the pan sits higher than the surrounding floor, but without a curb, and with the front edge of the pan tiled. The shower pan 19 can also be flush and curb-less; i.e. its top tiled surface sits flush with the surrounding floor and it does not have a curb along its front edge. The finish pieces 21a and 21b have generally been depicted as tile (ceramic, porcelain, or natural stone). Tiles can be of a variety of dimensions, (2" by 2", 6" by 6", 12" by 12", 18" by 18", 12" by 24", etc.) Other options for finish pieces include the placement of decorative-strips or accents which break up the pattern of tile and end trims which finish the pattern at the edges of the walls. It is further envisioned that other materials and patterns can be used as finish pieces (glass mosaics, pebble rock mosaics, metals, etc.).

Figure 27:
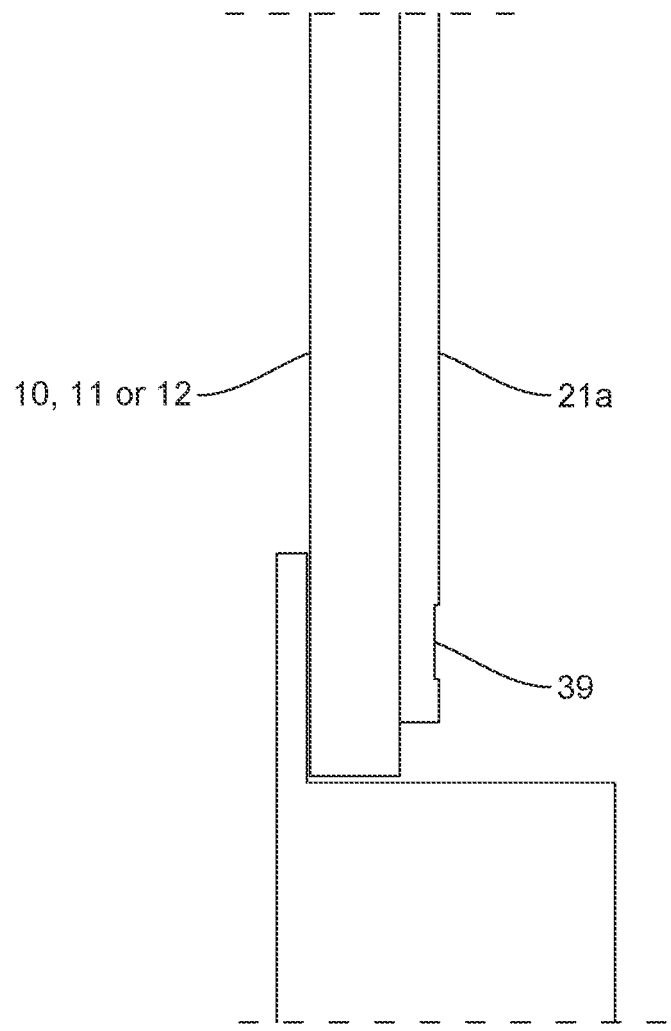

ADDITIONAL APPLICATIONS AND DIFFERENCES IN COMPOSITION AND BEST MODE OF IMPLEMENTATION. For a bathtub surround wall application, the general composition and best mode of implementation remains the same, except for the bottom edges of the system where the panels meet a bathtub rather than a shower pan. In the majority of cases, the panels at the bottom of the surround walls feature a bottom mating edge 39 variation, allowing the tiles to overhang the bathtub flange, but without the addition of oval holes 31 (FIG. 27). Any space created between the bathtub flange and panel/finish pieces is filled with waterproof adhesive during installation. For some bathtub applications, and small shower applications, six or less panels may be required. For wainscots, backsplashes and any other applications which do not require the same degree of waterproofing (i.e., is not for a wet environment where the prevention of water leakage is of paramount importance), the system and its edges do not require the same complexity.

Therefore, this type of application will be provided with a simplified system consisting of standard sized panels which will contain either flush edges 34 or gapped finish edges 40, and which can be installed either directly into the studs or on top of existing surfaces. The work of cutting and fitting panels to the required space (and travelling around inward and outward corners) is handled in situ by the installer. The installer cuts panels at any required intervals and cuts edges by the required angle degree for corners (i.e. using the same process as for baseboard and crown molding). Extra finish piece accessories are provided where applicable to be installed in situ to finish the edges and add between adjacent panels.

Figure 28:
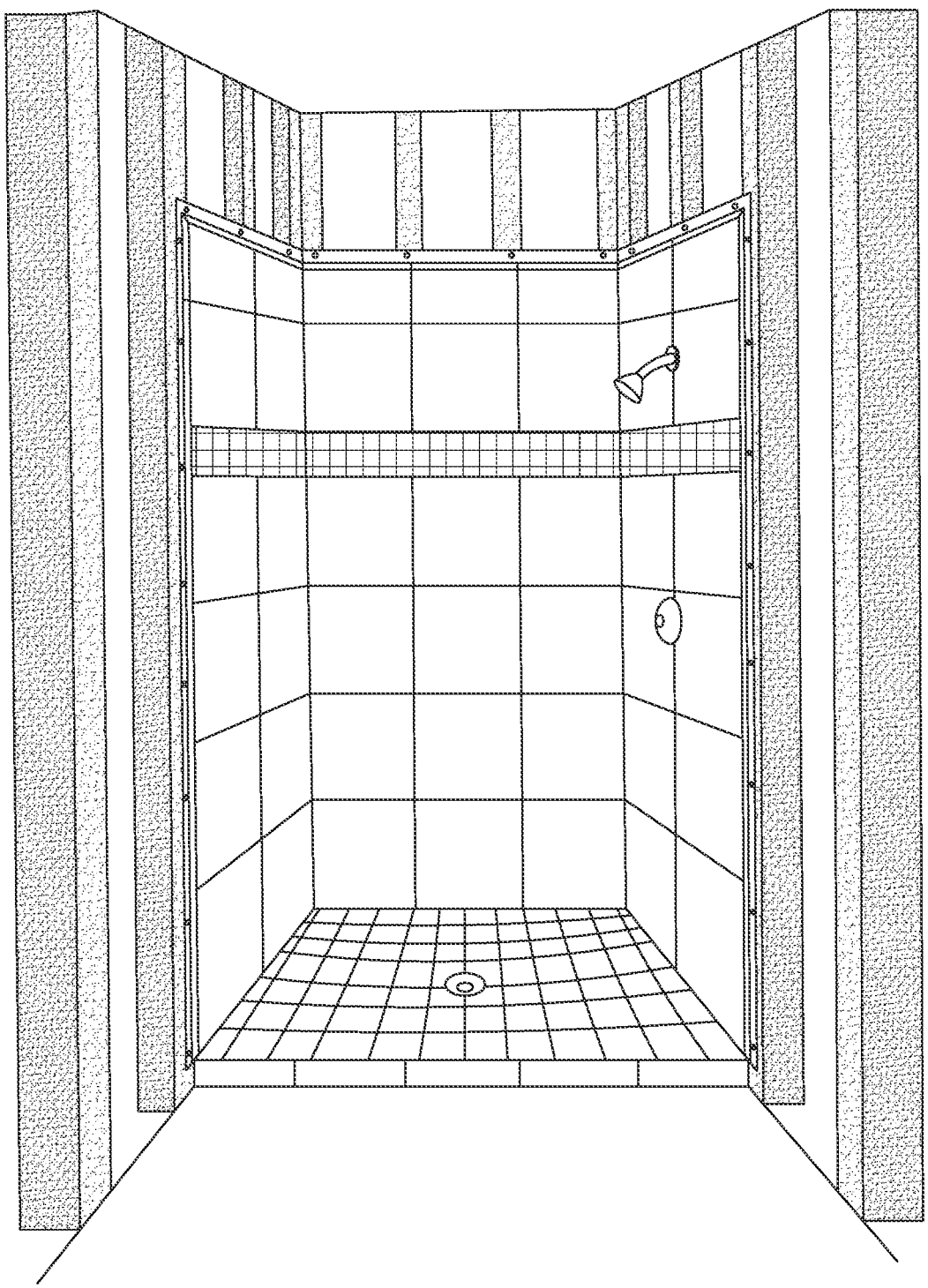
FIG. 28. A front perspective view of a completed shower surround and curb-less shower pan installation.

FIG. 28 illustrates a completed shower installation with a low profile, curb-less shower pan, a tiled finish on the surround and pan, and decorative strips and end trims featuring on the surround. The installation is surrounded by bare framing studs; the bathroom walls (dry wall, mortar cement, etc.) have yet to be installed to meet the shower system edges and finished with conventional materials.

Advantages

The key advantage of this system over existing methods for installing tiled walls, or other waterproof surfaces with finish pieces, is the pre-finished state in which it arrives at an installation site. Significant reductions in installation time, labor requirements (in particular skilled labor), cost and on-site disruption and debris are achieved. The finished panels (and shower pan if required) and their associated edge configurations enable a fast and easy installation, and simultaneously ensure that the installed product is waterproof, light weight, mold-resistant and has an aesthetically accurate, consistent, high-quality finish. The quality, accuracy, and technical performance attainable with the system is superior to all known products and methods.

Disclosed shower surround assembly is of a high functional quality and high aesthetic quality. The disclosed shower surround assembly can be manufactured from certain selected materials for desired properties that can be combined and placed in a certain specific way as described below. The materials can include closed cell foam, Epoxy resin, Fiberglass, and Aluminum L-extrusion. The aluminum L-extrusion can provide a 1½" high flange for waterproofing which is ½" higher than required by code or provided by most one-piece plastic or fiberglass shower trays. Combining the materials together and/or placing them in particular relationships to one another creates a result where the "sum is greater than the parts", i.e., the required properties are greatly enhanced. In addition, the mixing of materials makes the sequence of manufacture possible and successful. For example, when the epoxy resin & the fiberglass are mixed as a laminate layer, the combined strength is greater than each part separately. The laminate including a 2" foam sandwiched between the epoxy resin and the fiberglass has more than the added strength, dimensional stability, and durability. The shower tray made of the above laminate is more durable than the combined strength of the epoxy resin and the fiberglass.

In certain embodiment, epoxy resin and foam dust ("epoxy putty") can be combined and the resulting epoxy putty has increased viscosity so that it does not run when applied, but instead holds its shape & place. This increases the strength, creates a more controlled and precise process, and ensures consistent, repeatable outcomes. The epoxy putty can be used to adhere the tiles for enhanced strength of the bond, greater stability, preventing brittleness and cracking, and increased durability/longevity in comparison to the conventional cement. The aluminum framing on the tray interior, such as when the framing is added around the top three edges of the tray, it increases the strength, rigidity, and dimensional stability, and provide a waterproof connection to the walls. In certain embodiments, attaching the aluminum to the foam before lamination, and laminating over the framing as well as the foam, ensures that the foam and framing become one stable unit, rather than two. If the fiberglass cloth were laid over the tray before adding the framing, the aluminum framing may peel off which would reduce the dimensional stability of the tray and may allow the tray to flex which might de-laminate parts of the tray interior, crack the grout, and cause mosaics to lift.

Example 1

Stage 1: Preparation of Foam Tray Body

First, a 2 inches block of foam was cut to create the tray dimensions. Then was cut a piece of foam needed for the curb with the required dimensions (this may vary depending on whether the tray is being manufactured to match mural walls or a conventional wall). Thereafter, Rout/mill pitch to drain on topside of tray, such that the pitch starts at 1½" from edge of tray on back and side edges and at 3½" from edge of tray on front edge. Rout a 1½" strip around the back and side edges of the tray.

Stage 2: Preparation and Attachment of Aluminum Flange and Curb Foam

Prepare the flange: Cut aluminum L-shaped extrusion into full length required for tray dimension. Cut a 45° angle piece out of the bottom L-part of the extrusion at the two points along the extrusion that will become the corners of the tray. Bend the extrusion 90° at both points along the extrusion to create two 90° corners. Pour epoxy resin along the 1½" strip at side and back edges, sit the flange into place, and allow to cure/dry. The flange will now sit flush with the top of the pitch (because the 1½" strip was routed prior to attaching the flange). Pour epoxy resin along the 3½" strip at the front of tray and sit the curb foam into place. Clamp into place while curing Stage 3: Lamination Laminate bottom and sides of tray—Lay fiberglass cloth on bottom of tray, pour on epoxy resin, evenly distribute resin, and saturate cloth (called a 'wet layout'). Repeat for front, left, right and back sides of tray/pan, including the outer vertical edges of the aluminum flange. Allow to cure/dry. Repeat laminating process for top of tray and curb, including the inner horizontal and vertical edges of the aluminum flange. Sand and smooth any excess of dried fiberglass/resin layer.

Stage 4=Tiling

Mark drain location and circular outline. Cut and dry lay (=fit without gluing) all mosaics and curb tile. Mark the mosaic where drain is located and cut the mosaic to match the circular outline of the drain. Temporarily screw a drain template into drain (the drain's strainer is used as the template). Glue mosaics, ensuring they do not overlap the template—Mix epoxy putty, Apply putty to tray surface, Lay mosaics into place, Allow to dry, Glue curb tile and profile—, Cut curb profile to required lengths, Mix epoxy putty, Apply putty to the back of the tile for the front and back sides of the curb, adhere tile to front and back sides of the curb, apply putty to three locations—left, center, right—on the front and back edges of the top side of the curb, place profiles into their locations (front and back edges of the top side of the curb), apply putty to the back of the tile for the top side of the curb, adhere tile to top side of the curb, clamp tiles in place and allow to cure/dry.

Stage 5=Drain Fusion & Grouting

Fuse Drains with Tray. Grout Entire Tray—Mosaics and Curb Tile, and Finish Drains.

Drain Detail

The permanent fusion of the drain body into the tray body is potentially the most important stage of the tray manufacturing process. The two weakest points in a shower that can create failure of functionality and water leakage to occur are the tray-to-wall connection and the drain body to drainpipe connection. If the drain body is not held completely stable within the tray, its connection to the pipe can be compromised and cause a failure in waterproofing. It is also essential to not compromise the structural integrity and functioning of the drain body itself.

The method and sequence below ensure that the tray and drain body become fused as one piece so that the drain remains both completely stable and fully functional, and therefore guarantees consistent, long-lasting waterproofing. Example 1: taping the top and bottom of the drain body, ensures that no putty can penetrate the drain body. If the top and bottom of the drain body are not taped prior to fusion with the tray, putty will leak into the interior mechanism of the drain body and cause failure of the gasket connection to the drainpipe.

Example 2

Taping the convex shape at the bottom of the tray, ensures that it creates a space in which putty can flow into and fill and, as pressure is applied, there is enough volume of putty for it to fill every cavity. The convex rim of putty that is left upon tray completion ensures that there is a ¼" barrier completely fusing and sealing the bottom edge of the drain-tray connection. Before grouting: Remove template, Lay tray on to two stands, so that the center of the tray is not on a surface, Drill a correct size hole through tray from top to bottom in precise location for where the drain body needs to sit, Prepare drain body (remove all components and seal the top and bottom with tape), Insert drain into the hole, Adjust drain to be at the exact height needed to allow the strainer plate to be flush with the tile when in place on top of drain body, Shim underneath of the rim of drain to hold it stable at the correct height, and Tape over the hole on the bottom of the tray. Ensure the tape is not completely flush, but billows slightly downwards, creating a slight convex space. Thereafter, remove the drain and tape the shims into place, Mix resin putty, Pour and spread putty inside the hole in the tray, spreading it thickly and evenly around the inner surfaces of the hole and filling the convex space at the bottom, Pour putty around the drain body, Insert drain body slowly into the hole, allowing air to escape in the process, Push firmly downwards on all sides until it sits evenly on the shims, Excess putty will ooze upwards and outwards to seal the rim of the drain to the upper surface of the tray. Clean any excess putty that extends beyond the rim and on to any surrounding mosaic and allow to dry.

After grouting: Remove tape from top of drain, turn tray on to one side to access the bottom of the tray, Peel off the tape from the convex bottom of where the drain has been inserted. Grind excess resin putty until it exposes the bottom of the drain where the last bit of putty attached to the tape over the drain body will be visible, Remove the last bit of putty and tape by giving a gentle push that will dislodge the putty and tape as one round disc into the drain body, from where it can be pulled out, apply silicone over the ring of putty that surrounds the drain body on the bottom of the tray, for extra insurance that if any bubbles or gaps exist within the drain-putty-tray unit, there is another final waterproof barrier.

What is claimed is:

1. A building assembly comprising:
   a plurality of prefabricated panels, wherein each prefabricated panel of the plurality of prefabricated panels comprises:
   a backing sheet comprising:
   an upper composite sheet;
   a lower composite sheet;
   a core panel sandwiched between the upper composite sheet and the lower composite sheet, the core panel is made from an insulating foam material; and
   a U-shape frame around the core panel, wherein the U-shape frame clamps to sides of the core panel; and
   one or more finishing pieces bonded over a top surface of the backing sheet, wherein the one or more finishing pieces are selected from a group consisting of ceramic tiles, natural stones, glasses, and a combination thereof; and
   a shower pan, the shower pan comprising:
   an upper pan composite layer;
   a lower pan composite layer;
   a pan core sandwiched between the upper pan composite layer and the lower pan composite layer, wherein the pan core is manufactured from insulative foam material; and
   a drain hole passing through the upper pan composite layer, the lower pan composite layer, and the pan core, wherein a top surface of the pan core is sloped from sides towards the drain hole,
   wherein three flanges are provided on a top left edge, a top right edge, and a top rear edge of the shower pan,
   wherein the U-shape frame of each of three lower prefabricated panels of the plurality of prefabricated panels and the three flanges further comprises interlocking fasteners for coupling the three lower prefabricated panels to the shower pan.

2. The building assembly according to claim 1, wherein each of the upper composite sheet and the lower composite sheet is made from a fabric material impregnated with a bonding agent.

3. The building assembly according to claim 2, wherein the upper composite sheet and the lower composite sheet are made from fiberglass.

4. The building assembly according to claim 3, wherein the bonding agent is epoxy resin, wherein the upper composite sheet and the lower composite sheet are bonded to the core panel using the epoxy resin.

5. The building assembly according to claim 4, wherein the one or more finishing pieces are bonded to the upper composite sheet using epoxy putty, wherein the epoxy potty comprises an epoxy resin and foam dust.

6. The building assembly according to claim 1, wherein each of the interlocking fasteners comprises a male mating member and a female mating member, wherein the male mating member is a locating screw, and the female mating member is an oval hole, wherein the locating screw is configured to move within the oval hole only side-by-side.

7. The building assembly according to claim 1, wherein the three flanges are of L-shape.

8. A method for covering a wall or a floor of a building unit, the method comprising the steps of:
   providing a building assembly comprising:
   a plurality of prefabricated panels, wherein each prefabricated panel of the plurality of prefabricated panels comprises:
   a backing sheet comprising:
   an upper composite sheet,
   a lower composite sheet,
   a core panel sandwiched between the upper composite sheet and the lower composite sheet, the core panel is made from an insulating foam material, and
   a U-shape frame around the core panel, wherein the U-shape frame clamps to sides of the core panel, and
   one or more finishing pieces bonded over a top surface of the backing sheet, wherein the one or more finishing pieces are selected from a group consisting of ceramic tiles, natural stones, glasses, and a combination thereof, and
   a shower pan, the shower pan comprising:
   an upper pan composite layer,
   a lower pan composite layer,
   a pan core sandwiched between the upper pan composite layer and the lower pan composite layer, wherein the pan core is manufactured from insulative foam material, and
   a drain hole passing through the upper pan composite layer, the lower pan composite layer, and the pan core, wherein a top surface of the pan core is sloped from sides towards the drain hole,
   wherein three flanges are provided on a top left edge, a top right edge, and a top rear edge of the shower pan,
   wherein the U-shape frame of each of three lower prefabricated panels of the plurality of prefabricated panels and the three flanges further comprises interlocking fasteners for coupling the three lower prefabricated panels to the shower pan; and
   assembling the building assembly for covering the wall or the floor.

9. The method according to claim 8, wherein each of the upper composite sheet and the lower composite sheet is made from a fabric material impregnated with a bonding agent.

10. The method according to claim 9, wherein the upper composite sheet and the lower composite sheet are made from fiberglass.

11. The method according to claim 10, wherein the bonding agent is epoxy resin, wherein the upper composite sheet and the lower composite sheet are bonded to the core panel using the epoxy resin.

12. The method according to claim 11, wherein the one or more finishing pieces are bonded to the upper composite sheet using epoxy putty, wherein the epoxy potty comprises an epoxy resin and foam dust.

13. The method according to claim 8, wherein each of the interlocking fasteners comprises a male mating member and a female mating member, wherein the male mating member is a locating screw, and the female mating member is an oval hole, wherein the locating screw is configured to move within the oval hole only side-by-side.

14. The method according to claim 8, wherein the three flanges are of L-shape.

* * * * *